United States Patent
Tatsuta

(10) Patent No.: US 11,036,775 B2
(45) Date of Patent: Jun. 15, 2021

(54) INFORMATION RECORDING SYSTEM AND INFORMATION RECORDING METHOD

(71) Applicant: OLYMPUS CORPORATION, Tokyo (JP)

(72) Inventor: Seiji Tatsuta, Tokyo (JP)

(73) Assignee: OLYMPUS CORPORATION, Tokyo (JP)

(*) Notice: Subject to any disclaimer, the term of this patent is extended or adjusted under 35 U.S.C. 154(b) by 111 days.

(21) Appl. No.: 16/510,166

(22) Filed: Jul. 12, 2019

(65) Prior Publication Data

US 2019/0340188 A1 Nov. 7, 2019

Related U.S. Application Data

(63) Continuation of application No. PCT/JP2017/002706, filed on Jan. 26, 2017.

(51) Int. Cl.
*G06F 16/33* (2019.01)
*G06F 16/63* (2019.01)
*G06F 16/338* (2019.01)

(52) U.S. Cl.
CPC .......... *G06F 16/334* (2019.01); *G06F 16/338* (2019.01); *G06F 16/63* (2019.01)

(58) Field of Classification Search
None
See application file for complete search history.

(56) References Cited

U.S. PATENT DOCUMENTS

| 2001/0018698 | A1 | 8/2001 | Uchino et al. |
| 2006/0206324 | A1* | 9/2006 | Skilling ................ G06F 16/685 |
| | | | 707/E17.103 |
| 2009/0030894 | A1* | 1/2009 | Mamou ............... G06F 16/3343 |
| 2012/0236178 | A1* | 9/2012 | Nusbaum ................ G06F 16/31 |

(Continued)

FOREIGN PATENT DOCUMENTS

| JP | H 11-143912 A | 5/1999 |
| JP | 2005-084879 A | 3/2005 |
| JP | 2007-293600 A | 11/2007 |

(Continued)

OTHER PUBLICATIONS

International Search Report dated Apr. 25, 2017 issued in PCT/JP2017/002706.

*Primary Examiner* — Son T Hoang
(74) *Attorney, Agent, or Firm* — Scully, Scott, Murphy & Presser, P.C.

(57) ABSTRACT

In an information recording system, a sound processing unit generates a conversion candidate word in a process of converting sound information into text information. A recording unit records the text information and the conversion candidate word on a recording medium such that the text information and the conversion candidate word are associated with each other. A search unit performs a search based on a keyword and extracts a word matching the keyword from words within the text information and the conversion candidate word. A reading unit reads the text information including the word matching the keyword from the recording medium. A display unit displays the text information such that a part corresponding to the word matching the keyword and a part other than the corresponding part are able to be distinguished.

8 Claims, 20 Drawing Sheets

(56) References Cited

U.S. PATENT DOCUMENTS

2014/0169547 A1* 6/2014 Murgai ............... G06F 16/2228
2014/0258285 A1* 9/2014 Lavine .................... G06F 16/29
707/728

FOREIGN PATENT DOCUMENTS

| JP | 2008-085582 A | 4/2008 |
| JP | 2008-199079 A | 8/2008 |
| JP | 2011-167301 A | 9/2011 |
| JP | 2011-243011 A | 12/2011 |

* cited by examiner

INFORMATION RECORDING SYSTEM AND INFORMATION RECORDING METHOD The present application is a continuation application based on International Patent Application No. PCT/JP2017/002706, filed on Jan. 26, 2017, the content of which is incorporated herein by reference.

BACKGROUND OF THE INVENTION

Field of the Invention

The present invention relates to an information recording system and an information recording method.

Description of Related Art

In general, sounds in scenes such as conferences and interviews are recorded and the recorded sounds are used thereafter. For example, minutes and articles can be created by reproducing sounds and creating text based on the sounds. With the development of sound recognition technology, it has also become possible to generate text from a sound using sound recognition software.

Conventional observation devices record only information of an object obtained by observing the object. The record of a situation at an observation site as well as the record of information obtained by observation is regarded to be important to promote the use of data and prevent fraud. For example, there are examples of a laboratory notebook of a researcher, findings of a doctor, a construction site deployment report, and the like as examples of the record of the situation at the observation site. Also, the declining birthrate and aging population and the shortage of skilled workers have become a problem in every field. For the skill succession and education, the importance of recording of an on-site situation is increasing more and more. It is possible to record a situation of an observation site in more detail by recording text based on a sound of an observer in addition to information of an object. Also, it is possible to efficiently extract the information of the object in a desired situation by searching text for a word representing the situation of the observation site.

On the other hand, technology for recording information of an object and a sound in association has been disclosed. For example, in the technology disclosed in Japanese Unexamined Patent Application, First Publication No. 2008-199079, the appearance of an object is imaged and a sound uttered by an operator during imaging is acquired. The acquired image of the object and the acquired sound of the operator are recorded in association. In the technology disclosed in Japanese Unexamined Patent Application, First Publication No. 2008-085582, an image and a sound associated therewith are transmitted from a camera to a server. The server converts the received sound into text and generates information to be added to the image on the basis of a conversion result. The server stores the received image in association with the information generated on the basis of the sound.

SUMMARY OF THE INVENTION

According to a first aspect of the present invention, an information recording system includes a sound acquisition unit, a sound processing unit, a recording unit, a keyword reception unit, a search unit, a reading unit, and a display unit. The sound acquisition unit acquires sound information based on a sound uttered by a user. The sound processing unit converts the sound information acquired by the sound acquisition unit into text information and generates at least one conversion candidate word corresponding to the sound in a process of converting the sound information into the text information. The recording unit records the text information and the conversion candidate word such that the text information and the conversion candidate word are associated with each other. The keyword reception unit receives a keyword. The search unit searches for the keyword received by the keyword reception unit in the text information and the conversion candidate word and extracts a word matching the keyword from words within the text information and the conversion candidate word. The reading unit reads the text information including a first part corresponding to the word matching the keyword and a second part other than the first part from the recording medium. The display unit displays the text information read by the reading unit such that the first part and the second part are able to be distinguished.

According to a second aspect of the present invention, an information recording system includes an object information acquisition unit, a sound acquisition unit, a sound processing unit, a recording unit, a keyword reception unit, a search unit, a reading unit, and a display unit. The object information acquisition unit acquires object information about an object. The sound acquisition unit acquires sound information based on a sound uttered by an observer who observes the object. The sound processing unit converts the sound information acquired by the sound acquisition unit into text information and generates at least one conversion candidate word corresponding to the sound in a process of converting the sound information into the text information. The recording unit records the object information, the text information, the conversion candidate word, and time point information on a recording medium such that the object information, the text information, the conversion candidate word, and the time point information are associated with each other. The time point information indicates a time point at which the object information was acquired and a time point at which the sound information that is a source of the text information was acquired. The keyword reception unit receives a keyword. The search unit searches for the keyword received by the keyword reception unit in the text information and the conversion candidate word and extracts a word matching the keyword from words within the text information and the conversion candidate word. The reading unit reads the object information associated with the time point information corresponding to the word matching the keyword from the recording medium. The display unit displays the text information read by the reading unit.

According to a third aspect of the present invention, in the second aspect, the recording unit may record the object information, the sound information, the text information, the conversion candidate word, and the time point information on the recording medium such that the object information, the sound information, the text information, the conversion candidate word, and the time point information are associated with each other. The time point information indicates a time point at which the object information was acquired, a time point at which the sound information was acquired, and a time point at which the sound information that is a source of the text information was acquired. The information recording system may further include an event detection unit configured to detect at least two events on the basis of at least one piece of the object information and the sound information recorded on the recording medium. The events are a state in which the at least one piece of the object information and the sound information recorded on the recording medium satisfies a predetermined condition. The reading unit may read at least two pieces of the object information, each of which is associated with the time point information corresponding to an event occurrence time point that is a time point at which the event occurred from the recording medium. The display unit may display the object information read by the reading unit. The search unit may search for the keyword received by the keyword reception unit in the text information and the conversion candidate word that are associated with the time point information corresponding to the event occurrence time point. The display unit may display the object information associated with the time point information corresponding to the event occurrence time point at which the word matching the keyword was detected such that the object information is distinguished from other object information.

According to a fourth aspect of the present invention, in the second aspect, the recording unit may record the object information, the sound information, the text information, the conversion candidate word, and the time point information on the recording medium such that the object information, the sound information, the text information, the conversion candidate word, and the time point information are associated with each other. The time point information indicates a time point at which the object information was acquired, a time point at which the sound information was acquired, and a time point at which the sound information that is a source of the text information was acquired. The information recording system may further include an event detection unit configured to detect at least two events on the basis of at least one piece of the object information and the sound information recorded on the recording medium. The events are a state in which the at least one piece of the object information and the sound information recorded on the recording medium satisfies a predetermined condition. The reading unit may read the object information and the text information that are associated with the time point information corresponding to an event occurrence time point that is a time point at which the event occurred from the recording medium. The display unit may display the object information and the text information read by the reading unit. The search unit may search for the keyword received by the keyword reception unit in the text information and the conversion candidate word that are associated with the time point information corresponding to the event occurrence time point. The display unit may display the word that is within the text information and matches the keyword such that the word is distinguished from other words within the text information, and display the word that is within the text information and is associated with the conversion candidate word matching the keyword such that the word is distinguished from other words within the text information.

According to a fifth aspect of the present invention, in the third aspect, when a state of the object indicated by the object information is a state predefined as an event detection condition, the event detection unit may detect the event.

According to a sixth aspect of the present invention, in the fourth aspect, when a state of the object indicated by the object information is a state predefined as an event detection condition, the event detection unit may detect the event.

According to a seventh aspect of the present invention, in the third aspect, the sound information may be a time-series sound signal. When amplitude or power of the sound signal may exceed a threshold value predefined as an event detection condition, the event detection unit may detect the event.

According to an eighth aspect of the present invention, in the fourth aspect, the sound information may be a time-series sound signal. When amplitude or power of the sound signal may exceed a threshold value predefined as an event detection condition, the event detection unit may detect the event.

According to a ninth aspect of the present invention, in the third aspect, when a sound indicated by the sound information matches a sound of a keyword predefined as an event detection condition, the event detection unit may detect the event.

According to a tenth aspect of the present invention, in the fourth aspect, when a sound indicated by the sound information matches a sound of a keyword predefined as an event detection condition, the event detection unit may detect the event.

According to an eleventh aspect of the present invention, in the second aspect, the reading unit may read the object information and the text information that are associated with the time point information corresponding to the word matching the keyword from the recording medium. The display unit may display the object information and the text information read by the reading unit. The display unit may display the word that is within the text information and matches the keyword such that the word is distinguished from other words within the text information and display the word that is within the text information and is associated with the conversion candidate word matching the keyword such that the word is distinguished from other words within the text information.

According to a twelfth aspect of the present invention, in the second aspect, the recording unit may record the object information, the sound information, and the time point information on the recording medium such that the object information, the sound information, and the time point information are associated with each other. The time point information indicates a time point at which the object information was acquired and a time point at which the sound information was acquired. The reading unit may read the sound information from the recording medium. The sound processing unit may convert the sound information read by the reading unit into the text information and generates the conversion candidate word. The recording unit may associate the text information and the conversion candidate word with the object information and the time point information recorded on the recording medium and record the text information and the conversion candidate word on the recording medium. The time point information with which the text information is associated indicates a time point at which the sound information that is a source of the text information was acquired.

According to a thirteenth aspect of the present invention, an information recording method includes a sound acquisition step, a sound processing step, a recording step, a keyword reception step, a search step, a reading step, and a display step. In the sound acquisition step, a sound acquisition unit acquires sound information based on a sound uttered by a user. In the sound processing step, a sound processing unit converts the sound information acquired by the sound acquisition unit into text information and generates at least one conversion candidate word corresponding to the sound in a process of converting the sound information into the text information. In the recording step, a recording unit records the text information and the conversion candidate word on a recording medium such that the text information and the conversion candidate word are associated with each other. In the keyword reception step, a keyword reception unit receives a keyword. In the search step, a search unit searches for the keyword received by the keyword reception unit in the text information and the conversion candidate word and extracts a word matching the keyword from words within the text information and the conversion candidate word. In the reading step, a reading unit reads the text information including a first part corresponding to the word matching the keyword and a second part other than the first part from the recording medium. In the display step, a display unit displays the text information read by the reading unit such that the first part and the second part are able to be distinguished.

DETAILED DESCRIPTION OF THE INVENTION

Embodiments of the present invention will be described with reference to the drawings.

First Embodiment

Figure 1:
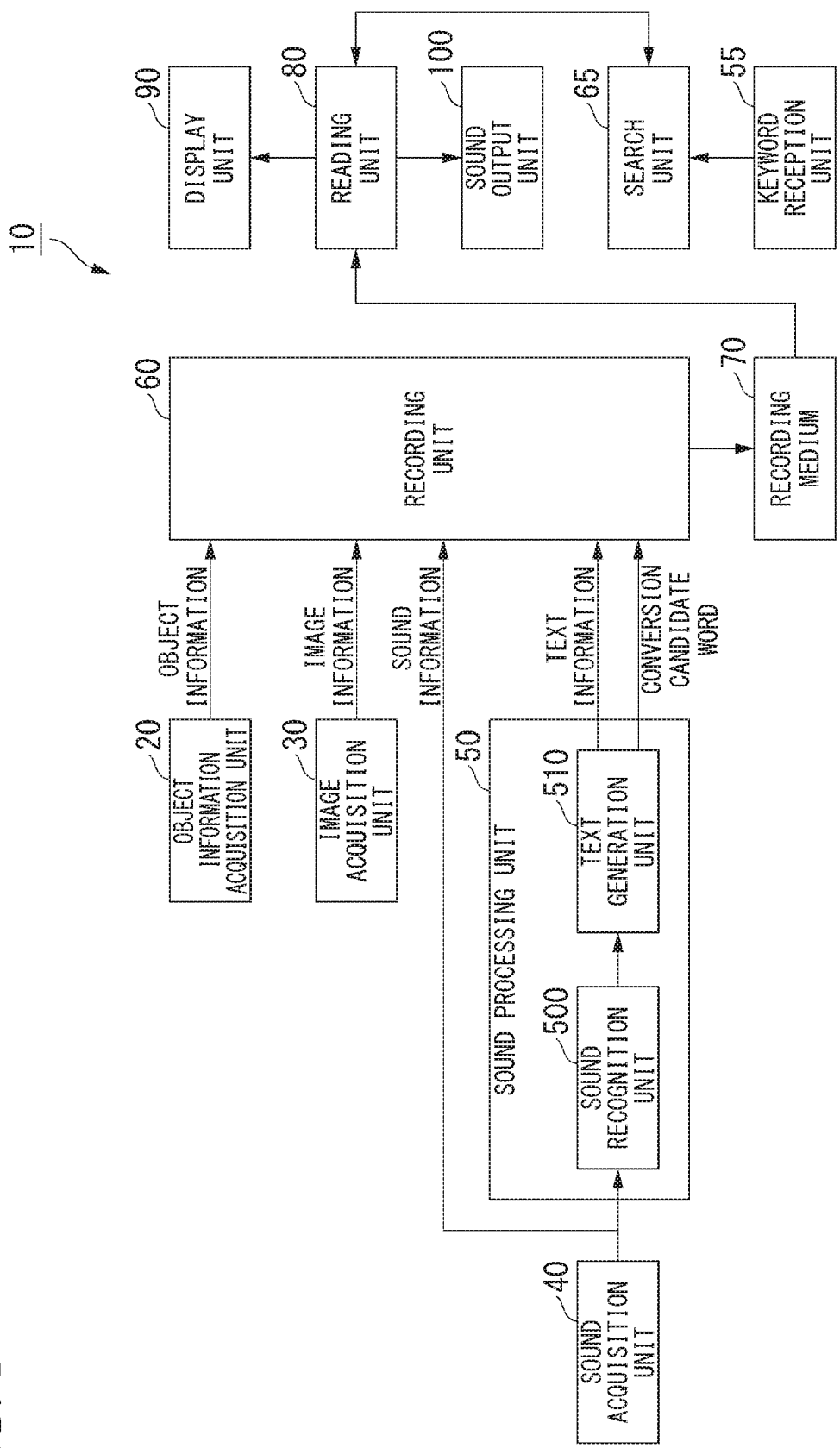
FIG. 1 is a block diagram showing a configuration of an information recording system according to a first embodiment of the present invention.

FIG. 1 shows a configuration of an information recording system 10 according to a first embodiment of the present invention. As shown in FIG. 1, the information recording system 10 includes an object information acquisition unit 20, an image acquisition unit 30, a sound acquisition unit 40, a sound processing unit 50, a keyword reception unit 55, a recording unit 60, a search unit 65, a recording medium 70, a reading unit 80, a display unit 90, and a sound output unit 100.

The object information acquisition unit 20 acquires object information about an object. The object is an object to be observed. The observation is an act of figuring out a state of the object. The observation may include acts such as diagnosis, an examination, and an inspection. The object information acquired for observation may not be necessarily visual information of the outside or inside of the object, i.e., image information. For example, the object information acquisition unit 20 is a camera mounted on image devices such as a microscope, an endoscope, a thermal imaging device, an X-ray device, and a computed tomography (CT) device. These image devices acquire image information of the object. These image devices may include a camera that generates image information on the basis of a signal obtained from a sensor. The image information acquired by these image devices may be any one of moving-image information and still-image information. The object information acquisition unit 20 may be a sensor that acquires information such as a temperature, acceleration, pressure, a voltage, and a current of the object. When the object is a living thing, the object information acquisition unit 20 may be a vital sensor that acquires vital information of the object. For example, the vital information is information such as a body temperature, blood pressure, a pulse, an electrocardiogram, or a degree of blood oxygen saturation. The object information acquisition unit 20 may be a microphone that acquires sound information based on a sound uttered by the object. For example, the sound information is information of a hammering test sound, an echo sound, a heart sound, noise, and the like. Additional information such as time point information may be added to the object information acquired by the object information acquisition unit 20. For example, the object information acquisition unit 20 adds time point information indicating a time point at which the object information was acquired to the object information, and outputs the object information to which the time point information is added. When the object information is time-series information, time point information for identifying a plurality of different time points is added to the object information. For example, the time point information associated with the object information includes a time point at which acquisition of the object information was started and a sampling rate.

The image acquisition unit 30 acquires image information indicating a type of situation in which the object information was acquired. The image information acquired by the image acquisition unit 30 indicates a state of at least one of the object and surroundings of the object when the object information is acquired. That is, the image information acquired by the image acquisition unit 30 indicates an observation situation. The image acquisition unit 30 is an image device including a camera. The image acquisition unit 30 acquires the image information in parallel with the acquisition of the object information by the object information acquisition unit 20. The image information acquired by the image acquisition unit 30 may be any one of moving image-information and still-image information. For example, the image acquisition unit 30 acquires the image information including an image of the at least one of the object and the surroundings of the object. For example, the surroundings of the object include a device on which the object information acquisition unit 20 is mounted. In this case, image information including an image of at least one of the object and the device on which the object information acquisition unit 20 is mounted is acquired. The surroundings of the object may also include an observer who observes the object. In this case, image information including an image of at least one of the object and the observer is acquired. The image acquisition unit 30 is disposed such that at least one of the object and the surroundings of the object is included in a photographing range.

When the image information acquired by the image acquisition unit 30 includes an image of the object, the image information includes an image of a part or all of the object. When the image information acquired by the image acquisition unit 30 includes an image of the device on which the object information acquisition unit 20 is mounted, the image information includes an image of a part or all of the device. When the image information acquired by the image acquisition unit 30 includes an image of a user, the image information includes an image of a part or all of the user. When the object information acquisition unit 20 is an image device and the object information is an image of the object, a photographic visual field of the image acquisition unit 30 is wider than that of the object information acquisition unit 20. For example, the object information acquisition unit 20 acquires image information of a part of the object and the image acquisition unit 30 acquires image information of all of the object. The image acquisition unit 30 may be a wearable camera worn by the user, i.e., an observer. For example, the wearable camera is a head mount type camera mounted in the vicinity of the eyes of the observer such that image information corresponding to the viewpoint of the observer can be acquired. Therefore, the image acquisition unit 30 may be disposed at a position of the viewpoint of the observer who observes the object or in the vicinity of the viewpoint. Additional information such as time point information may be added to the image information acquired by the image acquisition unit 30. For example, the image acquisition unit 30 adds the time point information indicating a time point at which the image information was acquired to the image information and outputs the image information to which the time point information is added. When the image information is time-series information, time point information for identifying a plurality of different time points is added to the image information. For example, the time point information associated with the image information includes a time point at which acquisition of the image information was started and a sampling rate.

The sound acquisition unit 40 acquires sound information based on a sound uttered by the observer who observes the object. For example, the sound acquisition unit 40 is a microphone. The sound acquisition unit 40 may be a wearable microphone worn by the observer. The wearable microphone is worn in the vicinity of the observer's mouth. The sound acquisition unit 40 may be a microphone having directivity such that only the sound of the observer is acquired. In this case, the sound acquisition unit 40 may not be installed in the vicinity of the observer's mouth. Thereby, a degree of freedom with respect to the disposition of the sound acquisition unit 40 is obtained. Because noise other than the sound of the observer is eliminated, the efficiency in generation and search of text information is improved. In parallel with the acquisition of the object information by the object information acquisition unit 20, the sound acquisition unit 40 acquires sound information. Additional information such as time point information may be added to the sound information acquired by the sound acquisition unit 40. For example, the sound acquisition unit 40 adds the time point information indicating a time point at which the sound information was acquired to the sound information and outputs the sound information to which the time point information is added. When the sound information is time-series information, the time point information for identifying a plurality of different time points is added to the sound information. For example, the time point information associated with the sound information includes a time point at which acquisition of the sound information was started and a sampling rate.

The sound processing unit 50 converts the sound information acquired by the sound acquisition unit 40 into text information and generates at least one conversion candidate word corresponding to the sound in a process of converting the sound information into the text information. For example, the sound processing unit 50 includes a sound processing circuit that performs sound processing. The sound processing unit 50 includes a sound recognition unit 500 and a text generation unit 510. The sound recognition unit 500 recognizes the sound of the user, i.e., the observer, on the basis of the sound information acquired by the sound acquisition unit 40. The text generation unit 510 generates text information corresponding to the user's sound by converting the sound recognized by the sound recognition unit 500 into the text information. The text generation unit 510 may divide consecutive sounds into appropriate blocks and generate text information for each block. For example, a block constitutes one sentence or clause. The block may include a part satisfying a predetermined condition. For example, the block may include an utterance part corresponding to a sound "ah", a silence part, or the like. The block may correspond to an event to be described below. Also, the text generation unit 510 generates at least one conversion candidate word corresponding to the sound in the process of converting the sound information into the text information. For example, the text generation unit 510 extracts candidate words recognized by the sound recognition unit 500 with predetermined accuracy or more. The text generation unit 510 selects a word with the highest accuracy among the candidate words as a determined word. The text generation unit 510 generates text information including the determined word. Also, the text generation unit 510 generates a word other than the determined word among the candidate words as a conversion candidate word. Pronunciation of a conversion candidate word is similar to pronunciation of a determined word. The generated conversion candidate word is associated with the determined word constituting the text information. The sound processing unit 50 (the text generation unit 510) outputs the text information and the conversion candidate word. Additional information such as time point information may be added to the text information generated by the sound processing unit 50. For example, the sound processing unit 50 (the text generation unit 510) adds time point information indicating a time point at which the text information was generated to the text information and outputs the text information to which the time point information is added. At this time, the sound processing unit 50 (the text generation unit 510) adds the time point information to the determined word. Alternatively, the sound processing unit 50 (the text generation unit 510) adds the time point information to the conversion candidate word and the determined word. That is, the sound processing unit 50 (the text generation unit 510) adds the time point information to the text information for each word. The time point information may be added to the text information for each block or for each event to be described below. When the text information is time-series information, time point information corresponding to a plurality of different time points is added to the text information. The time point of the text information corresponds to a start time point of the sound information associated with the text information.

The object information acquired by the object information acquisition unit 20, the image information acquired by the image acquisition unit 30, the sound information acquired by the sound acquisition unit 40, the text information generated by the sound processing unit 50, and the conversion candidate word generated by the sound processing unit 50 are input to the recording unit 60. The recording unit 60 records the object information, the image information, the sound information, the text information, the conversion candidate word, and the time point information on the recording medium 70 such that the object information, the image information, the sound information, the text information, the conversion candidate word, and the time point information are associated with each other. At this time, the recording unit 60 associates the object information, the image information, the sound information, the text information, and the conversion candidate word with each other on the basis of the time point information. For example, the recording unit 60 includes a recording processing circuit that performs an information recording process. At least one piece of the object information, the image information, the sound information, the text information, and the conversion candidate word may be compressed. Therefore, the recording unit 60 may include a compression processing circuit for compressing information. The recording unit 60 may include a buffer for the recording process and the compression process. The time point information indicates time points at which the object information, the image information, and the sound information were acquired. The time point information associated with the text information indicates the time point at which the sound information that is a source of the text information was acquired. For example, the time point information is added to each piece of the object information, the image information, the sound information, and the text information. The object information, the image information, the sound information, and the text information are associated with each other via the time point information. The determined word and the conversion candidate word that constitute the text information are associated with each other. The time point information may be added to the conversion candidate word. In this case, the object information, the image information, the sound information, the text information, and the conversion candidate word are associated with each other via the time point information.

The object information, the image information, the sound information, the text information, and the conversion candidate word are associated with each other as information about a common object. The object information, the image information, the sound information, the text information, and the conversion candidate word may be associated with each other as information about a plurality of objects related to each other. For example, each piece of the object information, the image information, the sound information, the text information, and the conversion candidate word includes one file and the recording unit 60 records each file on the recording medium 70. In this case, information for associating files of the object information, the image information, the sound information, the text information, and the conversion candidate word is recorded on the recording medium 70.

The recording medium 70 is a nonvolatile storage device. For example, the recording medium 70 is at least one of an erasable programmable read only memory (EPROM), an electrically erasable programmable read-only memory (EEPROM), a flash memory, and a hard disk drive. The recording medium 70 may not be disposed at an observation site. For example, the information recording system 10 may have a network interface and the information recording system 10 may be connected to the recording medium 70 via a network such as the Internet or a local area network (LAN). The information recording system 10 may have a wireless communication interface and the information recording system 10 may be connected to the recording medium 70 through wireless communication according to a standard such as Wi-Fi (registered trademark) or Bluetooth (registered trademark). Therefore, the information recording system 10 may not directly include the recording medium 70.

The keyword reception unit 55 receives a keyword. For example, the keyword reception unit 55 is configured as an operation unit. For example, the operation unit is configured to include at least one of a button, a switch, a key, a mouse, a joystick, a touch pad, a track ball, and a touch panel. The keyword reception unit 55 may be configured as a communication unit that wirelessly communicates with the operation unit. The user inputs a keyword for a search via the keyword reception unit 55. A keyword includes one or more words.

The search unit 65 searches for a keyword received by the keyword reception unit 55 in the text information and the conversion candidate word and extracts a word matching the keyword from the word (the determined word) within the text information and the conversion candidate word. For example, the search unit 65 includes an information processing circuit that performs information processing. For example, the text information and the conversion candidate word recorded on the recording medium 70 are read by the reading unit 80. The search unit 65 searches for the keyword in the text information and the conversion candidate word read by the reading unit 80. As a result of the search, any one of the determined word and the conversion candidate word can match the keyword. Alternatively, neither the determined word nor the conversion candidate word may match the keyword. Also, the time point information recorded on the recording medium 70 is read by the reading unit 80. When the determined word matches the keyword, the search unit 65 identifies the time point information associated with the determined word. Thereby, the search unit 65 identifies an utterance time point that is a time point at which a sound corresponding to the keyword was uttered. When the conversion candidate word matches the keyword, the search unit 65 identifies the conversion candidate word or the time point information associated with the determined word corresponding thereto. When the time point information is associated with text information for each block, the search unit 65 identifies the time point information associated with the block. When the time point information is associated with the text information for each event to be described below, the search unit 65 identifies the time point information associated with the event. The recording unit 60 may record the utterance time point identified by the search unit 65 on the recording medium 70.

The reading unit 80 reads the object information, the image information, the sound information, and the text information from the recording medium 70. Thereby, the reading unit 80 reproduces the object information, the image information, the sound information, and the text information recorded on the recording medium 70. For example, the reading unit 80 includes a reading processing circuit that performs an information reading process. At least one piece of the object information, the image information, the sound information, and the text information recorded on the recording medium 70 may be compressed. Therefore, the reading unit 80 may include a decompression processing circuit for decompressing the compressed information. The reading unit 80 may include a buffer for a reading process and a decompression process. The reading unit 80 reads the object information, the image information, the sound information, and the text information associated with the time point information corresponding to a word matching a keyword. For example, the reading unit 80 reads the object information, the image information, the sound information, and the text information associated with the same time point information corresponding to the utterance time point identified by the search unit 65, from the recording medium 70. When pieces of time point information associated with the information are not synchronized with each other, the reading unit 80 may read the information in consideration of a difference in the time point information with respect to a reference time point.

The display unit 90 displays the object information, the image information, and the text information read by the reading unit 80 such that the object information, the image information, and the text information are associated with each other. The display unit 90 is a display device such as a liquid crystal display. For example, the display unit 90 is a monitor of a personal computer (PC). The display unit 90 may be a wearable display such as smart glasses worn by the user. The display unit 90 may be a display unit of a device on which the object information acquisition unit 20 is mounted. The display unit 90 may be a large-size monitor for sharing information. The display unit 90 may be a touch panel display. For example, the display unit 90 simultaneously displays the object information, the image information, and the text information. At this time, the display unit 90 displays the object information, the image information, and the text information in a state in which these pieces of information are arranged. Information selected from a series of object information, image information, and text information corresponding to the same block or the event to be described below and associated with each other may be arranged and displayed on the display unit 90. Also, the user may be able to switch the information displayed on the display unit 90. For example, the object information acquired by the sensor or the vital sensor includes time-series sensor signals. For example, the display unit 90 displays a waveform of a sensor signal as a graph.

The display unit 90 may visually display the sound information read by the reading unit 80 as character information or a chart. In this case, the display unit 90 displays the object information, the image information, the sound information, and the text information read by the reading unit 80 such that the object information, the image information, the sound information, and the text information are associated with each other. For example, the sound information includes time-series sound signals. For example, the display unit 90 displays a change in amplitude or power of the sound signal over time as a graph.

The sound output unit 100 outputs a sound based on the sound information read by the reading unit 80. For example, the sound output unit 100 is a speaker.

When the object information acquired by the object information acquisition unit 20 is image information, the object information may be output to the display unit 90. The display unit 90 may display the object information in parallel with the acquisition of the object information by the object information acquisition unit 20. The image information acquired by the image acquisition unit 30 may be output to the display unit 90. The display unit 90 may display the image information acquired by the image acquisition unit 30 in parallel with the acquisition of the object information by the object information acquisition unit 20. Thereby, the user can figure out a state of the object and an observation situation in real time.

The sound processing unit 50, the recording unit 60, the search unit 65, and the reading unit 80 may include one or more processors. For example, the processor is at least one of a central processing unit (CPU), a digital signal processor (DSP), and a graphics processing unit (GPU). The sound processing unit 50, the recording unit 60, the search unit 65, and the reading unit 80 may include an application specific integrated circuit (ASIC) or a field-programmable gate array (FPGA).

In the information recording system 10, the image information acquisition and recording are optional. Therefore, the information recording system 10 may not include the image acquisition unit 30. In this case, the recording unit 60 records the object information, the sound information, the text information, the conversion candidate word, and the time point information on the recording medium 70 such that the object information, the sound information, the text information, the conversion candidate word, and the time point information are associated with each other. The time point information indicates time points at which the object information and the sound information were acquired and also indicates a time point at which the sound information that is a source of the text information was acquired. The reading unit 80 reads the object information, the sound information, and the text information associated with the time point information corresponding to the word matching the keyword from the recording medium 70. The display unit 90 displays the object information and the text information read by the reading unit 80 such that the object information and the text information are associated with each other. The sound output unit 100 outputs a sound based on the sound information read by the reading unit 80.

The information recording system 10 may not include the sound output unit 100 and the recording unit 60 may not record the sound information. In this case, the recording unit 60 records the object information, the image information, the text information, the conversion candidate word, and the time point information on the recording medium 70 such that the object information, the image information, the text information, the conversion candidate word, and the time point information are associated with each other. The time point information indicates time points at which the object information and the image information were acquired and also indicates a time point at which the sound information that is a source of the text information was acquired. The reading unit 80 reads the object information, the image information, and the text information associated with the time point information corresponding to the word matching the keyword from the recording medium 70. The display unit 90 displays the object information, the image information, and the text information read by the reading unit 80 such that the object information, the image information, and the text information are associated with each other.

Figure 2:
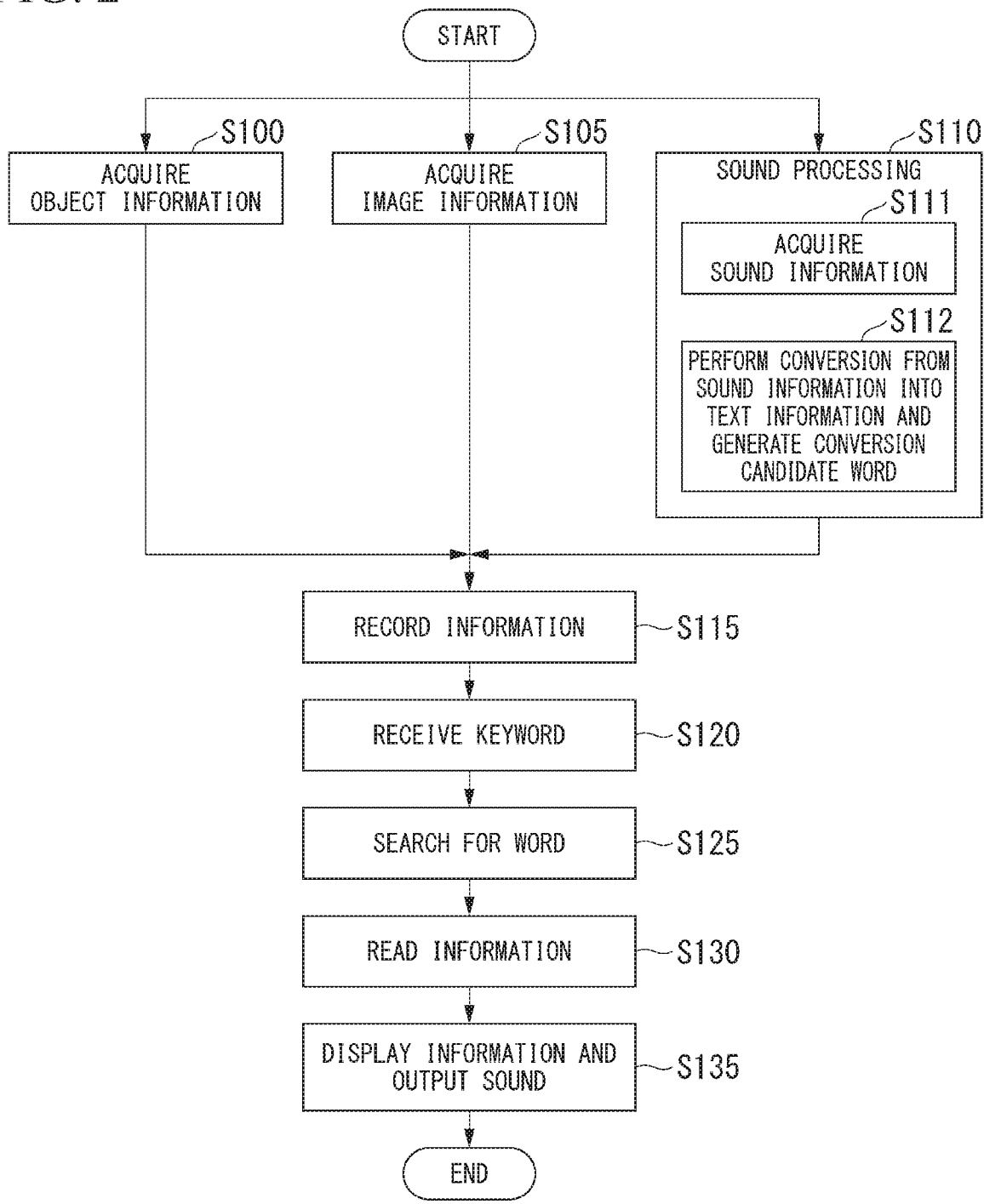
FIG. 2 is a flowchart showing a procedure of processing of the information recording system according to the first embodiment of the present invention.

FIG. 2 shows a procedure of processing of the information recording system 10. The procedure of processing of the information recording system 10 will be described with reference to FIG. 2.

The object information acquisition unit 20 acquires object information about an object (step S100 (an object information acquisition step)). The object information acquired in step S100 is stored in the buffer within the recording unit 60. In parallel with the acquisition of the object information by the object information acquisition unit 20, the image acquisition unit 30 acquires image information indicating a type of situation in which the object information was acquired (step S105 (an image acquisition step)). The image information acquired in step S105 is stored in the buffer within the recording unit 60. In parallel with the acquisition of the object information by the object information acquisition unit 20, the processing in step S110 is performed. Step S110 includes step S111 (a sound acquisition step) and step S112 (a sound processing step). In step S111, the sound acquisition unit 40 acquires sound information based on a sound uttered by the observer who observes the object. In step S112, the sound processing unit 50 converts the sound information acquired by the sound acquisition unit 40 into text information and generates at least one conversion candidate word corresponding to a sound in a process of converting the sound information into the text information. In step S110, the processing in step S111 and step S112 is iterated. The sound information acquired in step S111, the text information generated in step S112, and the conversion candidate word generated in step S112 are stored in the buffer within the recording unit 60. Also, the time point information corresponding to the time point at which the information was generated is stored in the buffer within the recording unit 60.

Processing start timings of step S100, step S105, and step S110 may not be the same. Processing end timings of step S100, step S105, and step S110 may not be the same. At least some of periods during which the processing in step S100, step S105, and step S110 is performed overlap each other.

After the acquisition of the object information, the image information, and the sound information is completed, the recording unit 60 records the object information, the image information, the sound information, the text information, the conversion candidate word, and the time point information stored in the buffer within the recording unit 60 on the recording medium 70 such that the object information, the image information, the sound information, the text information, the conversion candidate word, and the time point information are associated with each other (step S115 (a recording step)).

After step S115, the keyword reception unit 55 receives a keyword (step S120 (a keyword reception step)).

After step S120, the search unit 65 searches for the keyword received by the keyword reception unit 55 in the text information and the conversion candidate word, and extracts a word matching the keyword from the words within the text information and the conversion candidate word (step S125 (a search step)).

After step S125, the reading unit 80 reads the object information, the image information, the sound information, and the text information associated with the time point information corresponding to the word matching the keyword from the recording medium 70 (step S130 (a reading step)). The user may be able to specify a timing at which the information is read.

After step S130, the display unit 90 displays the object information, the image information, and the text information read by the reading unit 80 such that the object information, the image information, and the text information are associated with each other. Also, the sound output unit 100 outputs a sound based on the sound information read by the reading unit 80 (step S135 (a display step and a sound output step)).

When the information recording system 10 does not include the image acquisition unit 30, the processing in step S105 is not performed. Also, in step S115, the recording unit 60 records the object information, the sound information, the text information, the conversion candidate word, and the time point information on the recording medium 70 such that the object information, the sound information, the text information, the conversion candidate word, and the time point information are associated with each other. In step S130, the reading unit 80 reads the object information, the sound information, and the text information associated with the time point information corresponding to the word matching the keyword from the recording medium 70. In step S135, the display unit 90 displays the object information and the text information read by the reading unit 80 in step S130 such that the object information and the text information are associated with each other. Also, in step S135, the sound output unit 100 outputs a sound based on the sound information read by the reading unit 80 in step S130.

When the information recording system 10 does not include the sound output unit 100 and the recording unit 60 does not record the sound information, the recording unit 60 records the object information, the image information, the text information, the conversion candidate word, and the time point information on the recording medium 70 such that the object information, the image information, the text information, the conversion candidate word, and the time point information are associated with each other in step S115. In step S130, the reading unit 80 reads the object information, the image information, and the text information associated with the time point information corresponding to the word matching the keyword from the recording medium 70. In step S135, the display unit 90 displays the object information, the image information, and the text information read by the reading unit 80 in step S130 such that the object information, the image information, and the text information are associated with each other.

At a conventional observation site, the user records a situation of an observation site by writing by hand. On the other hand, because users are working in various environments and situations at a site, there is a case in which it is difficult to record at a site. There are cases in which the users cannot use their hands for reasons of safety or hygiene. In these cases, there is a possibility that a user will cause omissions in recording or erroneous recording due to recording an on-site situation on the basis of ambiguous memory after observation.

As described above, the object information is acquired by the object information acquisition unit 20 and the image acquisition unit 30 acquires the image information indicating a type of situation in which the object information was acquired. The acquired object information and image information are recorded on the recording medium 70 by the recording unit 60. Thereby, the information recording system 10 can record visual information indicating a type of situation in which the object information was acquired.

In the above-described method, a burden on the user for recording the information indicating a type of situation in which the object information was acquired is small. Even when the user cannot use his/her hand, necessary information can be recorded and omissions in recording or erroneous recording are reduced. Therefore, the information recording system 10 can accurately and efficiently leave a record showing the type of situation in which the object information was acquired.

In the above-described method, the user's comments when the object information was acquired are recorded as a sound and text corresponding to the sound is recorded in association with the object information and the image information. A "tag" based on the text is attached to the object information, the image information, and the sound information and therefore the user can easily understand a situation when the information was acquired.

In the above-described method, the conversion candidate word generated in the process of converting the sound information into the text information is recorded on the recording medium 70 by the recording unit 60. The search unit 65 searches for the keyword received by the keyword reception unit 55 in the text information and the conversion candidate word and extracts a word matching the keyword from the words within the text information and the conversion candidate word. Even when a word erroneously recognized in a sound recognition process cannot be extracted from the text information through a search, the search unit 65 can extract the conversion candidate word corresponding to the erroneously recognized word. Therefore, the information recording system 10 can reduce omissions in a word search in text information. As a result, the information recording system 10 can provide the user with object information, image information, sound information, and text information corresponding to the keyword received by the keyword reception unit 55.

Figure 3:
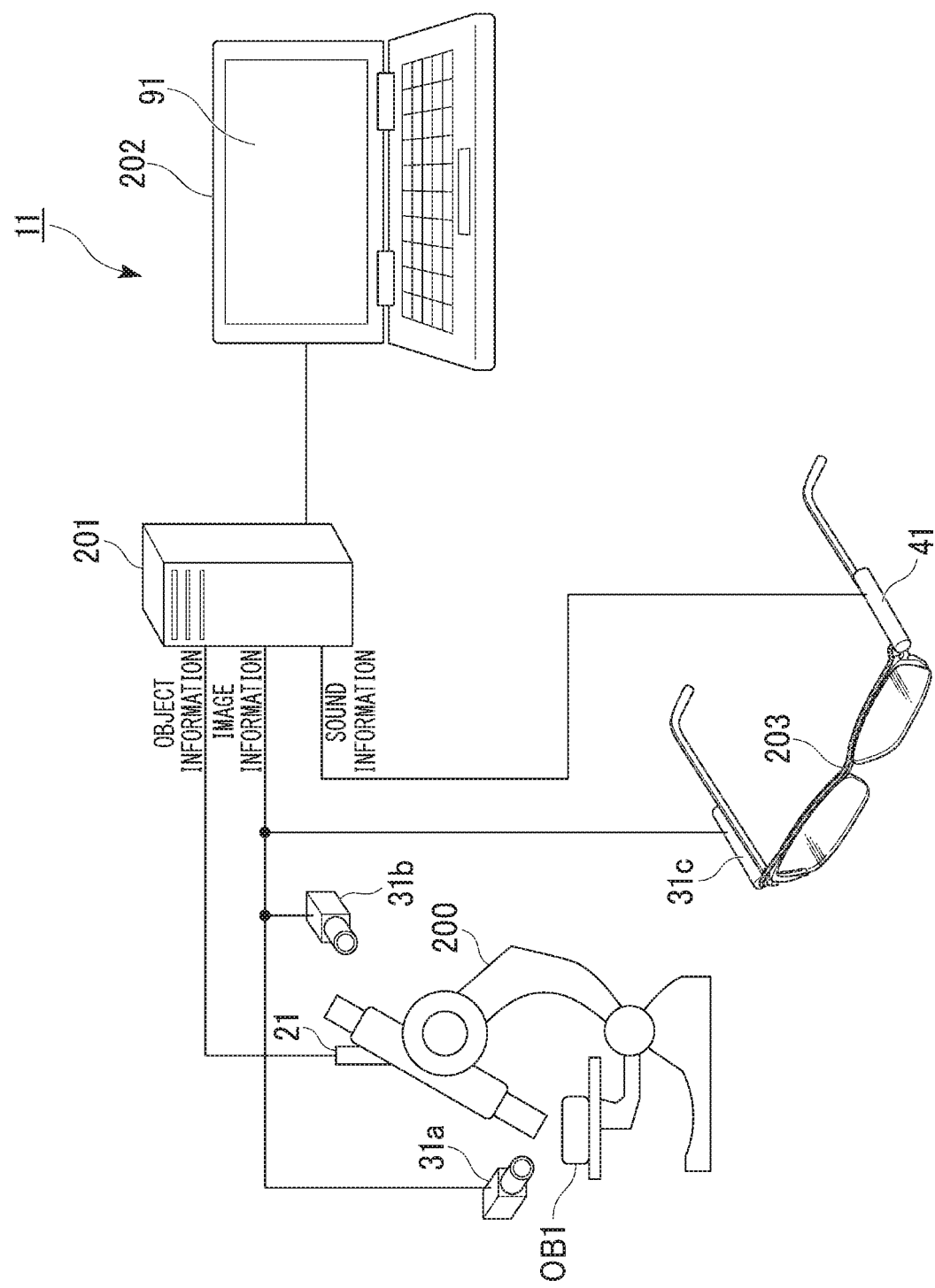
FIG. 3 is a diagram showing a schematic configuration of a microscope system according to the first embodiment of the present invention.

A specific example of the information recording system 10 will be described below. FIG. 3 shows a schematic configuration of a microscope system 11 which is an example of the information recording system 10. As shown in FIG. 3, the microscope system 11 includes a microscope 200, a camera 31a, a camera 31b, a camera 31c, a microphone 41, a server 201, and a PC 202.

The microscope 200 is a device for enlarging and observing an object OB1. The camera 21 connected to the microscope 200 constitutes the object information acquisition unit 20. The camera 21 acquires image information of the object OB1 enlarged by the microscope 200 as object information. For example, the camera 21 acquires moving-image information.

The camera 31a, the camera 31b, and the camera 31c constitute the image acquisition unit 30. A photographic visual field of each of the camera 31a, the camera 31b, and the camera 31c is wider than that of the camera connected to the microscope 200. For example, the camera 31a, the camera 31b, and the camera 31c acquire moving-image information.

The camera 31a is disposed in the vicinity of a tip of an objective lens of the microscope 200. The camera 31a acquires image information including an image of the object OB1 and the tip of the objective lens of the microscope 200 by photographing the vicinity of the tip of the objective lens of the microscope 200. Thereby, a positional relationship between the object OB1 and the tip of the objective lens of the microscope 200 is recorded as image information. The user who is the observer does not need to approach the object OB1 and the tip of the objective lens of the microscope 200 to check states thereof. By viewing the image information acquired by the camera 31a, the user can easily figure out a situation such as which part of the object OB1 is being observed or how close the objective lens tip of the microscope 200 is to the object OB1.

The camera 31b is disposed in an indoor space where observation is performed. The camera 31b acquires image information including an image of all of the object OB1 and the microscope 200 by photographing all of the object OB1 and the microscope 200. Thereby, all situations of an observation site are recorded as the image information. By viewing the image information acquired by the camera 31b, the user can easily figure out a situation such as an event occurring in a portion different from a portion to which the user is paying attention. When the object OB1 is a living thing, the state of the object OB1 is likely to affect the object information obtained by observation. For example, even when it is difficult to determine a state related to death and life of the object OB1 from the object information, the user can easily figure out the state of the object OB1 by viewing the image information acquired by the camera 31b. The camera 31b may acquire image information including an image of the user.

The camera 31c is configured as a wearable camera. The camera 31c is configured as the wearable camera by being attached to an accessory 203 capable of being attached to the user's head. When the user wears the accessory 203, the camera 31c is disposed at a position near a viewpoint of the user. The camera 31c acquires image information including an image of the object OB1 and the microscope 200 by photographing the object OB1 and the microscope 200. Alternatively, the camera 31c acquires image information including an image of the microscope 200 without including an image of the object OB1 by photographing the microscope 200. Thereby, an observation situation corresponding to a part to which the user is paying attention in observation is recorded as the image information. Thereby, the microscope system 11 can record observation states such as a situation before the object OB1 is set up on a microscope stage, a procedure of adjusting the microscope 200, and an adjustment state of the microscope 200. The user, other people, and the like can easily figure out a situation during the observation in real time or after the end of observation by viewing the recorded observation states.

The microphone 41 constitutes the sound acquisition unit 40. The microphone 41 is configured as a wearable microphone by being attached to the accessory 203.

The server 201 includes the sound processing unit 50, the keyword reception unit 55, the recording unit 60, the search unit 65, the recording medium 70, and the reading unit 80. The object information acquired by the camera 21, the image information acquired by the camera 31a, the camera 31b, and the camera 31c, and the sound information acquired by the microphone 41 are input to the server 201.

The PC 202 is connected to the server 201. The screen 91 of the PC 202 constitutes the display unit 90. The smart glasses may constitute the display unit 90. In parallel with the acquisition of the object information, the smart glasses may display the image information that is the object information and the image information acquired by each of the camera 31a, the camera 31b, and the camera 31c. By wearing the smart glasses, the user can figure out the state of the object OB1 and the observation situation in real time.

The information recording system 10 may be applied to a microscope system using a multiphoton excitation fluorescence microscope. The multiphoton excitation fluorescence microscope is used within a dark room. A camera connected to the multiphoton excitation fluorescence microscope constitutes the object information acquisition unit 20. For example, as infrared cameras, the camera 31a, the camera 31b, and the camera 31c constitute the image acquisition unit 30. The infrared camera acquires image information including an image of all of the object and the multiphoton excitation fluorescence microscope by photographing all of the object and the multiphoton excitation fluorescence microscope. For example, the user who is an observer wears a wearable microphone constituting the sound acquisition unit 40. A device such as a PC includes the sound processing unit 50, the keyword reception unit 55, the recording unit 60, the search unit 65, the recording medium 70, and the reading unit 80. The object information acquired by the camera connected to the multiphoton excitation fluorescence microscope, the image information acquired by the infrared camera, and the sound information acquired by the wearable microphone are input to the device. The screen of the device constitutes the display unit 90.

In a dark environment, it is difficult for the user to figure out the state of the microscope and the situation of the experiment and write the state and the situation that have been figured out on paper with the user's hand. In a system to which the information recording system 10 is applied, the user does not need to stop the experiment and turn on a light in order to know the state of the microscope and the situation of the experiment. Also, the user does not need to temporarily stop the microscope and look into the dark room. Also, the user does not need to manually write the state of the microscope and the situation of the experiment on paper with his/her hand.

The information recording system 10 may be applied to an endoscope system. An endoscope is a device for observing the inside of a body of a person, i.e., a patient. The user, i.e., the doctor, utters comments simultaneously with an inspection by the endoscope. The comments uttered by the user can be used to create accurate inspection records. These inspection records are used for the purpose of creating findings, materials for conference presentation, educational content for less experienced doctors, or the like.

The information recording system 10 may be applied to a medical examination system at a critical care emergency site. In the examination system, a vital sensor is worn on the person to be examined, i.e., the patient. The vital sensor acquires biological information such as a body temperature, blood pressure, and a pulse of the patient as object information. The user, i.e., the doctor, utters comments simultaneously with the acquisition of the object information by the vital sensor. The comments uttered by the user can be used to accurately and efficiently deliver findings at a site with respect to the patient to other people such as other doctors.

The information recording system 10 may be applied to an inspection system. In the inspection system, the probe acquires a signal such as a current according to a defect on the surface of an industrial product such as an aircraft fuselage as the object information. The user utters comments simultaneously with the acquisition of the object information by the probe. The comments uttered by the user can be used to create a work report with respect to examination. The information recording system 10 may be applied to an inspection system using an industrial endoscope. The industrial endoscope acquires image information of objects such as scratches and corrosion inside hollow objects such as boilers, turbines, engines, and chemical plants.

The information recording system 10 may be applied to a work recording system. In the work recording system, a camera acquires image information of an object such as a circuit board as the object information. The user utters comments simultaneously with the acquisition of the object information by the camera. The comments uttered by the user can be used to create accurate work records. The work records are used for the purpose of creating a work report related to work with respect to the object and educational content for less experienced workers. Also, the user can easily trace work on the basis of a work history when a problem or the like occurs by storing the work record as the work history.

Figure 4:
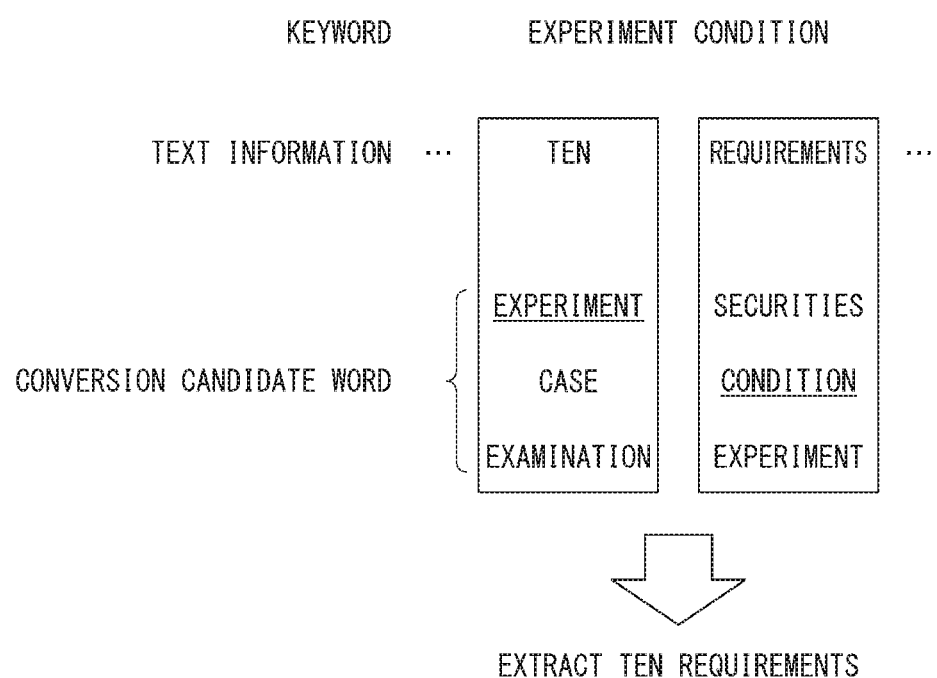
FIG. 4 is a reference diagram showing a search method of a search unit in the information recording system according to the first embodiment of the present invention.

Hereinafter, a search method of the search unit 65 will be described. FIG. 4 shows the search method of the search unit 65. In the example shown in FIG. 4, a keyword "experiment condition" is specified. The keyword "experiment condition" is pronounced as "jikken jyouken" in Japanese. In the example shown in FIG. 4, the keyword "experiment condition" is recognized as the term "ten requirements" without being correctly recognized in the sound recognition process. The term "ten requirements" is pronounced as "jyukken youken" in Japanese. The term "ten requirements" is included in the text information. The keyword "experiment condition" is not included in the text information. Thus, when a search has been performed under the keyword "experiment condition" according to the conventional technology, a part including the term "ten requirements" that is erroneously recognized is not extracted from the text information. That is, omissions in a search occur.

The keyword "experiment condition" is divided into two words "experiment" and "condition". The word "experiment" is pronounced as "jikken" in Japanese. The word "condition" is pronounced as "jyouken" in Japanese. Three conversion candidate words "experiment", "case", and "examination" are associated with the word "ten" in the text information which is the determined word after the sound recognition process. These are examples of words that are similar in pronunciation and easily misrecognized. The word "case" is pronounced as "jiken" in Japanese. The word "examination" is pronounced as "jyuken" in Japanese. The word "experiment" included in the keyword matches the word "experiment" in the conversion candidate word. Likewise, three conversion candidate words "securities", "condition", and "experiment" whose pronunciations are similar to each other are associated with the word "requirements" in the text information. The word "securities" is pronounced as "syouken" in Japanese. The word "condition" included in the keyword matches the word "condition" in the conversion candidate word. The keyword "experiment condition" does not match the word in the text information. However, the two words constituting the keyword match the conversion candidate words. Therefore, the search unit 65 extracts the term "ten requirements" associated with the conversion candidate words as a corresponding part from the text information.

In the above-described example, the search method in Japanese has been described. The above-described method can also be applied to searches in languages other than Japanese.

Figure 5:
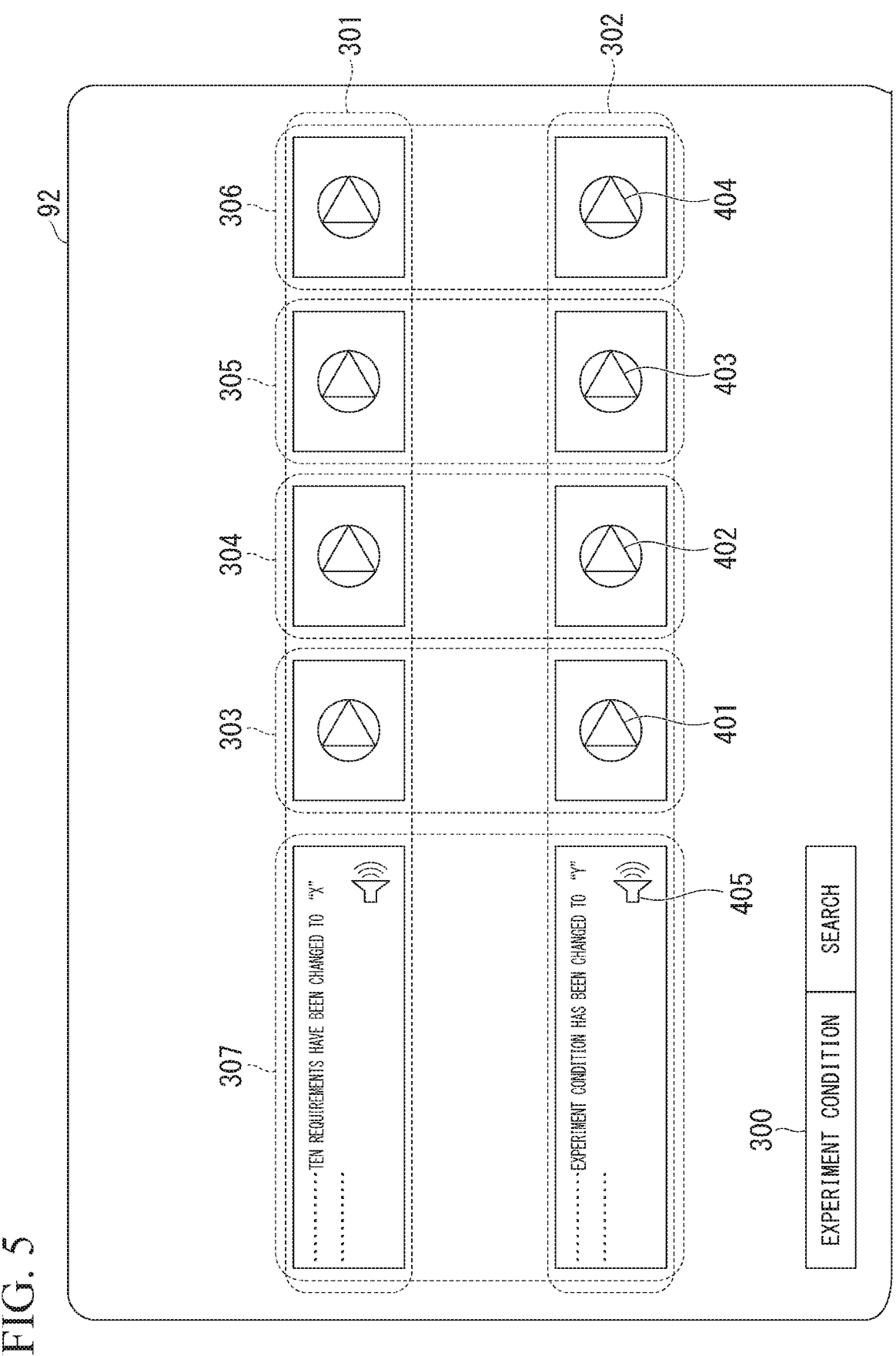
FIG. 5 is a reference diagram showing a screen of a display unit in the information recording system according to the first embodiment of the present invention.

A specific example in which the display unit 90 displays information will be described below. FIG. 5 shows a screen 92 of the display unit 90.

A keyword input field 300 is displayed on the screen 92. For example, the user can input a keyword to the keyword input field 300 by operating the operation unit. When the keyword is input to the keyword input field 300, the keyword reception unit 55 receives the keyword input to the keyword input field 300. In the example shown in FIG. 5, the term "experiment condition" is input as the keyword to the keyword input field 300.

The search unit 65 performs a search on the basis of a keyword received by the keyword reception unit 55. The search unit 65 extracts a word matching the keyword from words (determined words) within the text information and the conversion candidate word. The search unit 65 identifies an utterance time point by identifying time point information corresponding to the word matching the keyword. The reading unit 80 reads object information, image information, and text information associated with the same time point information corresponding to the utterance time point. The display unit 90 displays the object information, the image information, and the text information read by the reading unit 80 such that the object information, the image information, and the text information are associated with each other. The object information, the image information, and the text information associated with the same object are displayed on the screen 92. In this example, information in the observation based on the microscope system 11 shown in FIG. 3 is displayed.

In FIG. 5, two sets of the object information, the image information, and the text information are displayed. The text information is displayed for each appropriate block such as a sentence or a clause. Here, the corresponding object information, image information, and text information are displayed as the same set on the basis of the time point information associated with the block. The object information, the image information, and the text information corresponding to the same set are arranged in the horizontal direction. The object information, the image information, and the text information of each set are arranged at the same position in the vertical direction. The object information, the image information, and the text information corresponding to the first set are displayed in a region 301 of the screen 92. The object information, the image information, and the text information corresponding to the second set are displayed in a region 302 of the screen 92.

The object information is an image generated by a camera connected to the microscope 200. The object information is displayed in a region 303 of the screen 92. The image information is displayed in a region 304, a region 305, and a region 306 of the screen 92. Image information generated by the camera 31a for photographing the vicinity of the tip of the objective lens of the microscope is displayed in the region 304. Image information generated by the camera 31b for photographing all of the object OB1 and the microscope 200 is displayed in the region 305. Image information generated by the camera 31c attached to the user is displayed in the region 306. The text information is displayed in a region 307 of the screen 92. The text information corresponding to the first set includes the term "ten requirements" misrecognized with respect to the keyword "experiment condition". The text information corresponding to the second set includes text correctly recognized with respect to the keyword "experiment condition".

When the object information recorded on the recording medium 70 is divided into a plurality of pieces in a time series, the reading unit 80 reads the object information associated with the time point information within an event period corresponding to the utterance time point from the recording medium 70. The display unit 90 displays the object information read by the reading unit 80. For example, the object information is image information of the object and the image information of the object is moving-image information. The moving-image information includes image information of a plurality of frames generated at different time points. In this case, the reading unit 80 reads image information of the object of the plurality of frames generated during the event period from the recording medium 70. The display unit 90 sequentially displays the image information of the object of the plurality of frames read by the reading unit 80. For example, when the user has operated an icon 401, the display unit 90 displays a moving image of the object during the event period. The event period will be described below.

When the object information recorded on the recording medium 70 is divided into a plurality of pieces in a time series, the reading unit 80 may read representative object information associated with the time point information corresponding to the utterance time point from the recording medium 70. The display unit 90 may display the representative object information read by the reading unit 80. For example, the object information is image information of the object and the image information of the object is moving-image information. In this case, the reading unit 80 reads the image information of the object of one frame generated at a time point closest to the utterance time point from the recording medium 70. The display unit 90 displays the image information of the object of one frame read by the reading unit 80. A thumbnail of one frame generated at a time point closest to the utterance time point may be displayed.

When the image information recorded on the recording medium 70 is divided into a plurality of pieces in a time series, the reading unit 80 reads image information associated with the time point information within the event period corresponding to the utterance time point from the recording medium 70. The display unit 90 displays the image information read by the reading unit 80. For example, the image information acquired by the image acquisition unit 30 is moving-image information. In this case, the reading unit 80 reads the image information of a plurality of frames generated during the event period from the recording medium 70. The display unit 90 sequentially displays the image information of the plurality of frames read by the reading unit 80. For example, when the user has operated any one of an icon 402, an icon 403, and an icon 404, the display unit 90 displays a moving image showing an observation situation during the event period.

When the image information recorded on the recording medium 70 is divided into a plurality of pieces in a time series, the reading unit 80 may read representative image information associated with the time point information corresponding to the utterance time point from the recording medium 70. The display unit 90 may display the representative image information read by the reading unit 80. For example, the image information acquired by the image acquisition unit 30 is moving-image information. The reading unit 80 reads the image information of one frame generated at a time point closest to the utterance time point from the recording medium 70. The display unit 90 displays the image information of one frame read by the reading unit 80. A thumbnail of one frame generated at the time point closest to the utterance time point may be displayed.

The reading unit 80 reads the sound information associated with the time point information corresponding to the utterance time point from the recording medium 70. The sound output unit 100 outputs a sound based on the sound information read by the reading unit 80. For example, the reading unit 80 reads the sound information associated with the time point information within the event period corresponding to the utterance time point from the recording medium 70. For example, when the user has operated an icon 405, the sound output unit 100 outputs the sound during the event period.

The display unit 90 may display a word that is within the text information and matches the keyword such that the word is distinguished from other words within the text information and display the word that is within the text information and is associated with the conversion candidate word matching the keyword such that the word is distinguished from other words within the text information. That is, the display unit 90 may display the word that is within the text information and matches the keyword in a first display form, display the word that is within the text information and is associated with the conversion candidate word matching the keyword in a second display form, and display the other words within the text information in a third display form different from the first and second display forms. The first display form and the second display form may be the same. For example, the display unit 90 displays the word that is within the text information and matches the keyword and the word that is within the text information and is associated with the conversion candidate word matching the keyword such that each of the displayed words is emphasized more than the other words within the text information. For example, the display unit 90 displays the above-described words in a color different from those of the other words. The display unit 90 may display the above-described words with characters that are thicker than those of the other words. The display unit 90 may display the above-described words with characters that are larger than those of the other words. A method of distinguishing a specific word from the other words is not limited to the above-described method. By displaying the word corresponding to the keyword in the text information such that the displayed word is distinguished from other words, the user can easily check a search result.

Object information, image information, and text information corresponding to the same set may be arranged in the vertical direction. In this case, the object information, the image information, and the text information of each set are arranged at the same position in the horizontal direction.

The event period will be described below. The reading unit 80 reads the object information and the image information associated with the time point information corresponding to the time point included in the event period corresponding to the utterance time point from the recording medium 70. Also, the reading unit 80 reads the sound information and the text information associated with the time point information corresponding to the time point included in the event period corresponding to the utterance time point from the recording medium 70.

Figure 6:
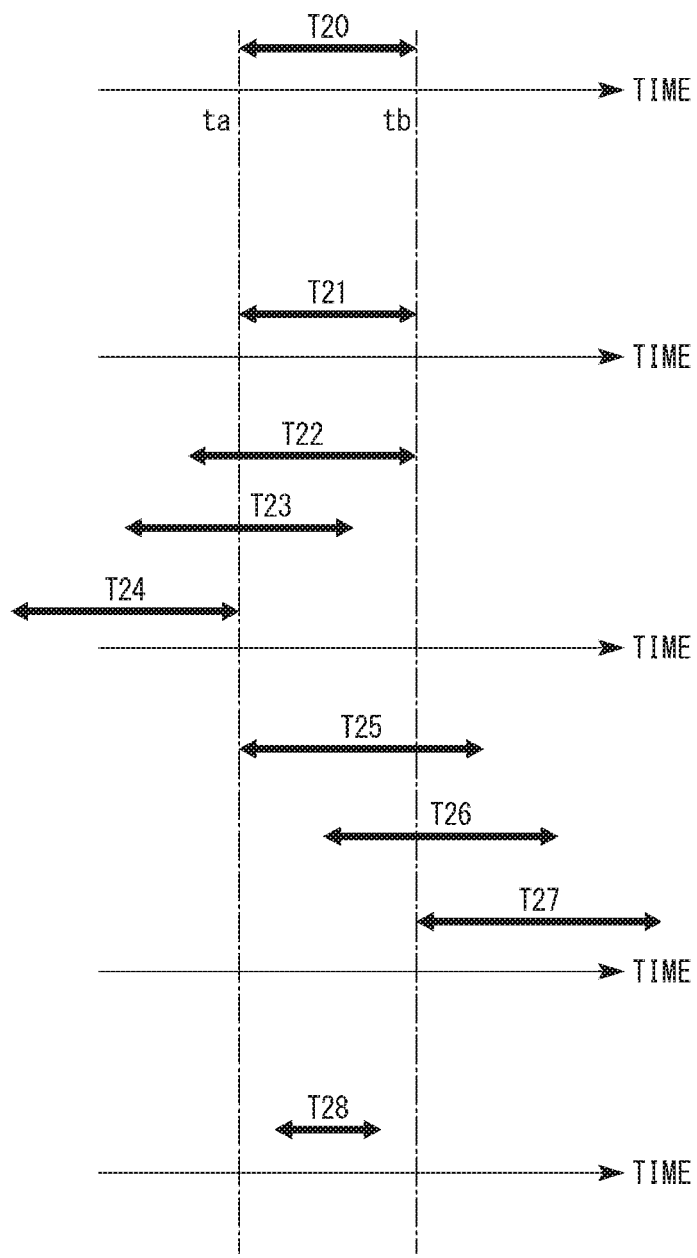
FIG. 6 is a reference diagram showing a relationship between an event occurrence time point and an event period in the information recording system according to the first embodiment of the present invention.

FIG. 6 shows a relationship between the event occurrence time point and the event period. An event occurrence time point T20 is a time point from an event start time ta to an event end time tb. This event continues to occur from the event start time ta to the event end time tb.

An event period T21 is the same as the event occurrence time point T20. An event period T22, an event period T23, and an event period T24 include a time point before the event occurrence time point T20. An end point of the event period T22 is the event end time point tb. An end point of the event period T24 is the event start time point ta. An event period T25, an event period T26, and an event period T27 include a time point later than the event occurrence time point T20. A start point of the event period T25 is the event start time ta. A start point of the event period T27 is the event end time tb. An event period T28 includes only a part of the event occurrence time point. The event period T28 includes only a time point after the event start time ta and a time point before the event end time tb.

In the above description, at least one of a time point before the event occurrence time point and a time point after the event occurrence time point may be a preset predetermined time point. Alternatively, at least one of the time points may be a time point relatively set on the basis of the event occurrence time point corresponding to the event period. Also, at least one of the time points may be set on the basis of the event occurrence time point before or after the event corresponding to the event period. The event may continue to be detected consecutively during a certain period of time. Alternatively, the event may be detected in a trigger manner for a short time. In this case, the event occurrence time point is approximately equal to the event end time point. For example, the event period may be a period from a timing that is 5 seconds before an event in which the amplitude of the sound signal exceeds the threshold value is detected to a timing when an event in which an increase of the object in the image of the object is stopped is detected.

The event period is shorter than a period from a first time point to a second time point. The first time point is the earliest time point indicated by the time point information associated with the object information. The second time point is the latest time point indicated by the time point information associated with the object information. When only one event is detected by the event detection unit 75, the event period may be the same as the period from the first time point to the second time point. The event period related to each piece of the image information, the sound information, and the text information is similar to the event period related to the object information.

The utterance time point is a timing at which the user pays attention. As described above, information corresponding to a predetermined period before or after the utterance time point is read from the recording medium 70. Thus, the user can efficiently view information about an event occurring at a timing when the user pays attention.

First Modified Example of First Embodiment

Figure 7:
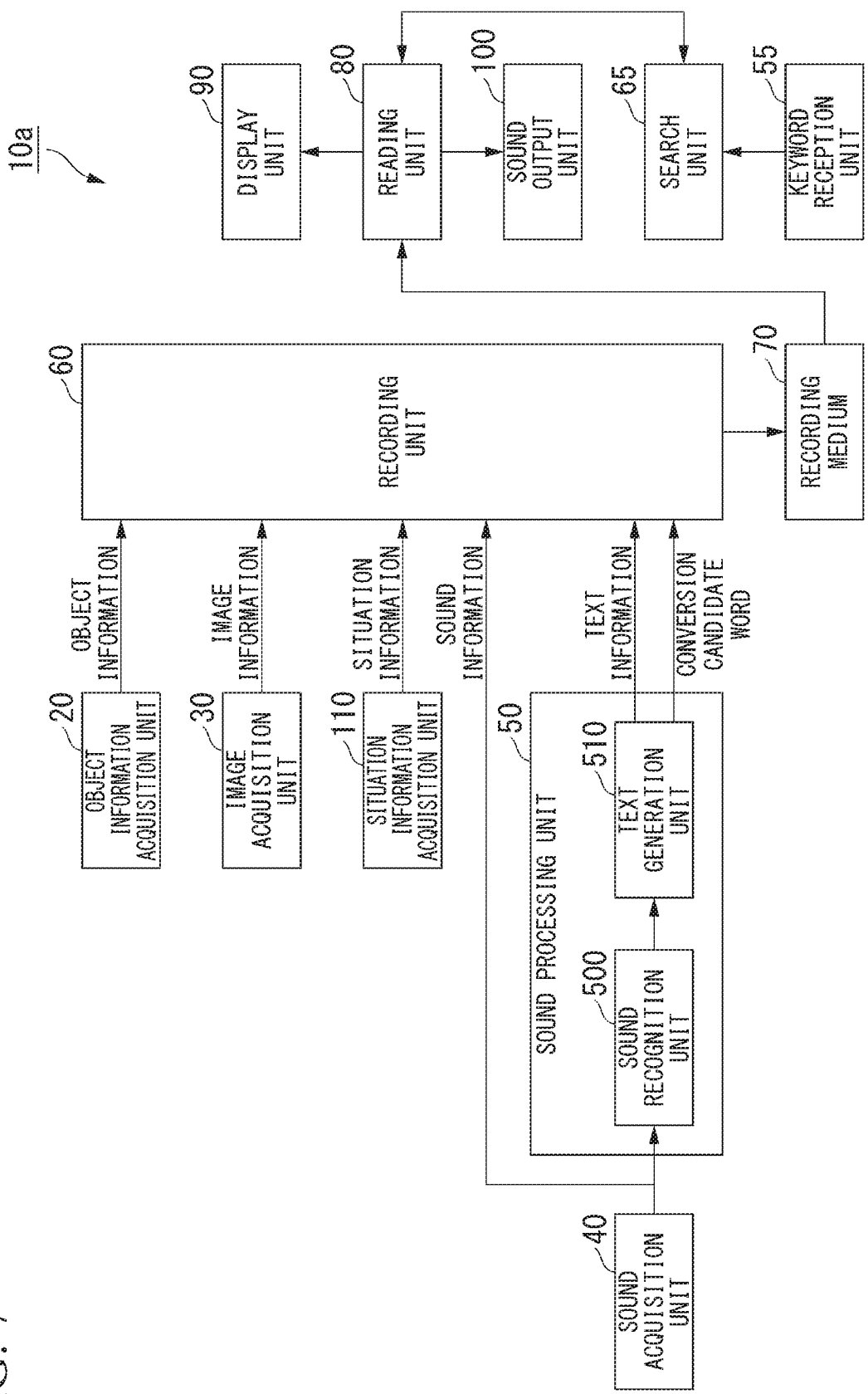
FIG. 7 is a block diagram showing a configuration of an information recording system according to a first modified example of the first embodiment of the present invention.

FIG. 7 shows a configuration of an information recording system 10*a* according to a first modified example of the first embodiment of the present invention. In terms of the configuration shown in FIG. 7, differences from the configuration shown in FIG. 1 will be described.

The information recording system 10*a* includes a situation information acquisition unit 110 in addition to the configuration of the information recording system 10 shown in FIG. 1. The situation information acquisition unit 110 acquires situation information that indicates a type of situation in which the object information was acquired and is information other than the image information of the object. For example, the situation information is information about at least one of a time point, a place, and a surrounding environment of the object. For example, the surrounding environment of the object indicates conditions such as temperature, humidity, atmospheric pressure, and illuminance. When the situation information is time point information, the situation information acquisition unit 110 acquires the time point information from a device that generates the time point information. For example, the situation information acquisition unit 110 acquires the time point information from terminals such as a smartphone and a PC. When the situation information is place information, the situation information acquisition unit 110 acquires the place information from a device that generates the place information. For example, the situation information acquisition unit 110 acquires the place information from a terminal such as a smartphone equipped with a Global Positioning System (GPS) function. When the situation information is surrounding environment information, the situation information acquisition unit 110 acquires the surrounding environment information from a device that measures a surrounding environment value. For example, the situation information acquisition unit 110 acquires the surrounding environment information from sensors such as a thermometer, a hygrometer, a barometer, and a luminometer.

The situation information may be device information about a device including an object information acquisition unit 20. The device information may be setting values of the device. For example, in a multiphoton excitation fluorescence microscope, the set values of the device are values such as lens magnification, an amount of observation light, laser power, and a stage position. Additional information such as time point information may be added to the situation information other than the time point information acquired by the situation information acquisition unit 110. For example, the situation information acquisition unit 110 adds the time point information indicating a time point at which the situation information was acquired to the situation information and outputs the situation information to which the time point information is added. When the situation information is time-series information, time point information for identifying a plurality of different time points is added to the situation information. For example, the time point information associated with the situation information includes a time point at which the acquisition of the situation information was started and a sampling rate.

A recording unit 60 records the object information, the image information, the sound information, the text information, the conversion candidate word, the situation information, and the time point information on a recording medium 70 such that the object information, the image information, the sound information, the text information, the conversion candidate word, the situation information, and the time point information are associated with each other. The time point information indicates time points at which the object information, the image information, the sound information, the text information, and the situation information were acquired. The object information, the image information, the sound information, the text information, the conversion candidate word, and the situation information are associated with each other via the time point information. The situation information may be compressed.

A reading unit 80 reads the object information, the image information, the text information, and the situation information associated with the time point information corresponding to the word matching the keyword from the recording medium 70. A display unit 90 displays the object information, the image information, the text information, and the situation information read by the reading unit 80 such that the object information, the image information, the text information, and the situation information are associated with each other. For example, the display unit 90 simultaneously displays the object information, the image information, the text information, and the situation information. At this time, the display unit 90 displays the object information, the image information, the text information, and the situation information in a state in which these pieces of information are arranged. Information selected from the object information, the image information, the text information, and the situation information may be displayed on the display unit 90 and the user may be able to switch information to be displayed on the display unit 90.

In terms of points other than the above, the configuration shown in FIG. 7 is similar to the configuration shown in FIG. 1.

When the situation information is recorded, the information recording system 10*a* can also record other information as information indicating a type of situation in which the object information was acquired in addition to visual information. Thereby, the information recording system 10*a* can more accurately record an observation situation. Therefore, the user can more accurately reproduce and verify an accurate procedure.

Second Modified Example of First Embodiment

Figure 8:
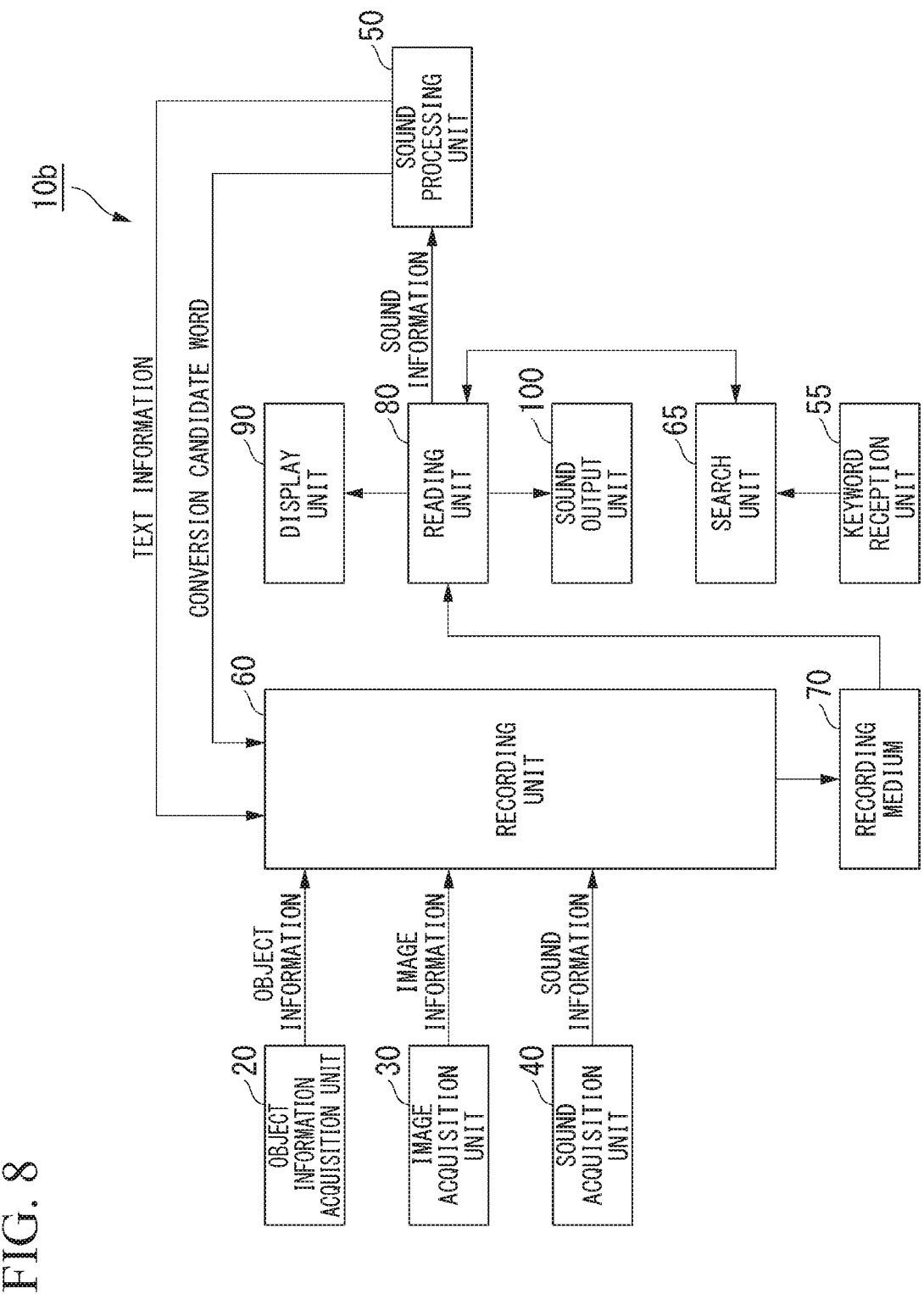
FIG. 8 is a block diagram showing a configuration of an information recording system according to a second modified example of the first embodiment of the present invention.

FIG. 8 shows a configuration of an information recording system 10*b* according to a second modified example of the first embodiment of the present invention. In terms of the configuration shown in FIG. 8, differences from the configuration shown in FIG. 1 will be described.

A recording unit 60 records object information, image information, sound information, and time point information on a recording medium 70 such that the object information, the image information, the sound information, and the time point information are associated with each other. A reading unit 80 reads the sound information from the recording medium 70. A sound processing unit 50 converts the sound information read by a reading unit 80 into text information and generates a conversion candidate word. The recording unit 60 associates the text information and the conversion candidate word with the object information, the image information, the sound information, and the time point information recorded on the recording medium 70 and records the text information and the conversion candidate word on the recording medium 70. The time point information indicates a time point at which the sound information that is a source of the text information was acquired.

In terms of points other than the above, the configuration shown in FIG. 8 is similar to the configuration shown in FIG. 1.

In the information recording system 10b, after the entire sound information is recorded on the recording medium 70, the sound processing is performed by the sound processing unit 50. Generally, the load of sound processing is high. Even when the sound processing rate is lower than the acquisition rate of the sound information, the information recording system 10b can record text information.

Third Modified Example of First Embodiment

Figure 9:
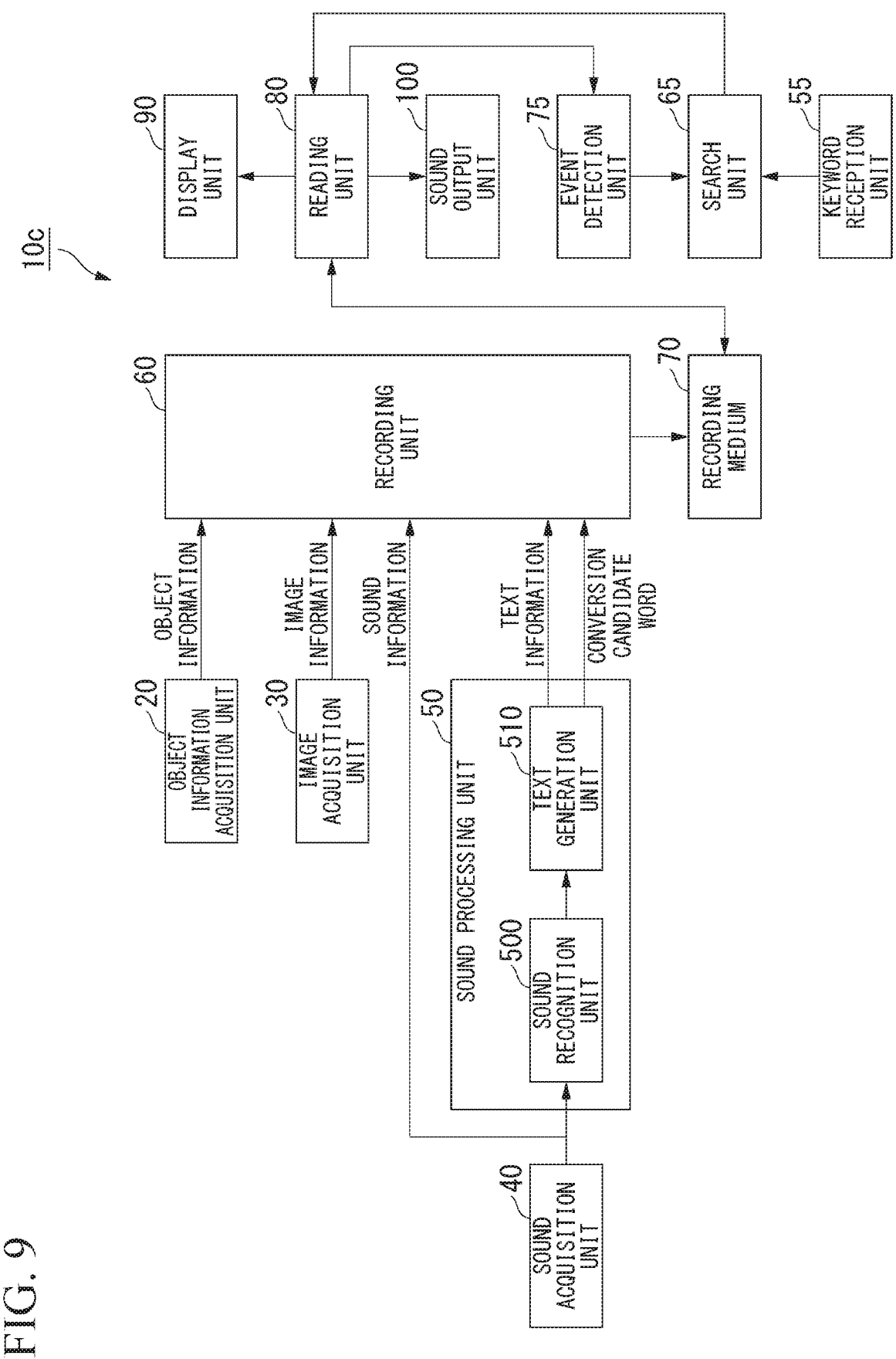
FIG. 9 is a block diagram showing a configuration of an information recording system according to a third modified example of the first embodiment of the present invention.

FIG. 9 shows a configuration of an information recording system 10c according to a third modified example of the first embodiment of the present invention. In terms of the configuration shown in FIG. 9, differences from the configuration shown in FIG. 1 will be described.

The information recording system 10c includes an event detection unit 75 in addition to the configuration of the information recording system 10 shown in FIG. 1. The event detection unit 75 detects an event on the basis of at least one piece of the object information, the image information, and the sound information recorded on the recording medium 70. The event is a state in which the at least one piece of the object information, the image information, and the sound information recorded on the recording medium 70 satisfies a predetermined condition. For example, the event detection unit 75 includes an information processing circuit that performs information processing. When the event detection unit 75 processes the image information, the event detection unit 75 includes an image processing circuit. When the event detection unit 75 processes the sound information, the event detection unit 75 includes a sound processing circuit. For example, the at least one piece of the object information, the image information, and the sound information recorded on the recording medium 70 is read by the reading unit 80. The event detection unit 75 detects an event on the basis of the information read by the reading unit 80. Also, the time point information recorded on the recording medium 70 is read by the reading unit 80. The event detection unit 75 identifies the event occurrence time point which is a time point at which the event occurred on the basis of a relationship between the time point information read by the reading unit 80 and information in which the event was detected. The recording unit 60 may record the event occurrence time point identified by the event detection unit 75 on the recording medium 70.

The reading unit 80 reads the object information, the image information, and the text information associated with the time point information corresponding to the event occurrence time point from the recording medium 70. The display unit 90 displays the object information, the image information, and the text information read by the reading unit 80. The search unit 65 searches for a keyword received by a keyword reception unit 55 in the text information and a conversion candidate word associated with the time point information corresponding to the event occurrence time point. The display unit 90 displays the object information, the image information, and the text information associated with the time point information corresponding to the event occurrence time point at which the word matching the keyword was detected such that the object information, the image information, and the text information are distinguished from other object information, other image information, and other text information. That is, the display unit 90 displays the object information, the image information, and the text information associated with the time point information corresponding to the event occurrence time point at which the word matching the keyword was detected in a first display form and displays other object information, other image information, and other text information in a second display form different from the first display form. The display forms are distinguished by changing a color and a thickness of a frame for displaying information, for example, according to a degree of emphasis for display.

The time point information is added to a determined word constituting the text information. Alternatively, the time point information is added to the determined word and the conversion candidate word. The event occurrence time point at which the word matching the keyword was detected is a time point indicated by the time point information added to the word. The conversion candidate word is associated with the determined word constituting the text information. When the conversion candidate word to which the time point information is not added matches the keyword, the time point information added to the determined word associated with the conversion candidate word indicates the event occurrence time point at which the conversion candidate word was detected.

The time point information may be added to the text information for each event detected by the event detection unit 75. That is, the event occurrence time point may be added to the text information.

When the information recording system 10c does not include the image acquisition unit 30, the recording unit 60 records the object information, the sound information, the text information, the conversion candidate word, and the time point information on the recording medium 70 such that the object information, the sound information, the text information, the conversion candidate word, and the time point information are associated with each other. The event detection unit 75 detects an event on the basis of at least one piece of the object information and the sound information recorded on the recording medium 70. The reading unit 80 reads the object information, the sound information, and the text information associated with the time point information corresponding to the event occurrence time point from the recording medium 70. The display unit 90 displays the object information and the text information read by the reading unit 80 such that the object information and the text information are associated with each other. The sound output unit 100 outputs a sound on the basis of the sound information read by the reading unit 80. The display unit 90 displays the object information and the text information associated with the time point information corresponding to the event occurrence time point at which the word matching the keyword was detected such that the object information and the text information are distinguished from other object information and other text information.

The information recording system 10c may not include the sound output unit 100 and the recording unit 60 may not record sound information. In this case, the recording unit 60 records the object information, the image information, the text information, the conversion candidate word, and the time point information on the recording medium 70 such that the object information, the image information, the text information, the conversion candidate word, and the time point information are associated with each other. The event detection unit 75 detects an event on the basis of at least one piece of the object information and the image information recorded on the recording medium 70. The reading unit 80 reads the object information, the image information, and the text information associated with the time point information corresponding to the event occurrence time point from the recording medium 70. The display unit 90 displays the object information, the image information, and the text information read by the reading unit 80 such that the object information, the image information, and the text information are associated with each other. The display unit 90 displays the object information, the image information, and the text information associated with the time point information corresponding to the event occurrence time point at which the word matching the keyword was detected such that the object information, the image information, and the text information are distinguished from other object information, other image information, and other text information.

In terms of points other than the above, the configuration shown in FIG. 9 is similar to the configuration shown in FIG. 1.

Figure 10:
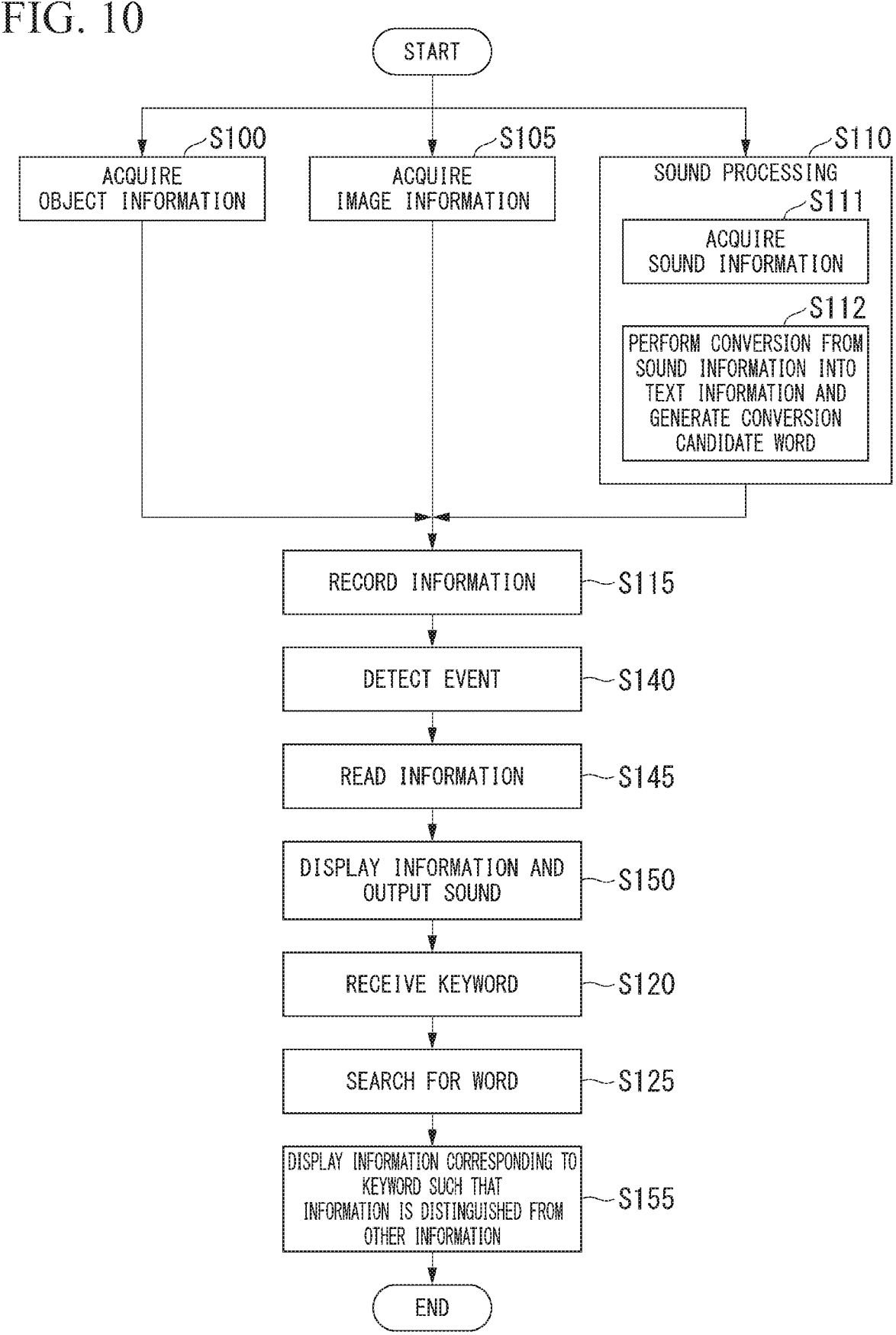
FIG. 10 is a flowchart showing a procedure of processing of the information recording system according to the third modified example of the first embodiment of the present invention.

FIG. 10 shows a procedure of processing of the information recording system 10c. In terms of the processing shown in FIG. 10, differences from the processing shown in FIG. 2 will be described.

After step S115, the event detection unit 75 detects an event on the basis of at least one piece of object information, image information, and sound information recorded on the recording medium 70 (step S140 (an event detection step)).

After step S140, the reading unit 80 reads the object information, the image information, the sound information, and text information associated with time point information corresponding to an event occurrence time point that is a time point at which an event occurred from the recording medium 70 (step S145 (a reading step)). The user may be able to specify a timing at which the information is read.

After step S145, the display unit 90 displays the object information, the image information, and the text information read by the reading unit 80 such that the object information, the image information, and the text information are associated with each other. Also, the sound output unit 100 outputs a sound based on the sound information read by the reading unit 80 (step S150 (a display step and a sound output step)). After step S150, the processing in step S120 is performed.

After step S125, the display unit 90 displays the object information, the image information, and the text information associated with the time point information corresponding to the event occurrence time point at which a word matching a keyword was detected such that the object information, the image information, and the text information are distinguished from other object information, other image information, and other text information (step S155 (a display step)).

In terms of points other than the above, the processing shown in FIG. 10 is similar to the processing shown in FIG. 2.

When the information recording system 10c does not include the image acquisition unit 30, the processing in step S105 is not performed. Also, in step S115, the recording unit 60 records the object information, the sound information, the text information, the conversion candidate word, and the time point information on the recording medium 70 such that the object information, the sound information, the text information, the conversion candidate word, and the time point information are associated with each other. In step S140, the event detection unit 75 detects an event on the basis of at least one piece of the object information and the sound information recorded on the recording medium 70. In step S145, the reading unit 80 reads the object information, the sound information, and the text information associated with the time point information corresponding to the event occurrence time point from the recording medium 70. In step S150, the display unit 90 displays the object information and the text information read by the reading unit 80 such that the object information and the text information are associated with each other. Also, in step S150, the sound output unit 100 outputs a sound based on the sound information read by the reading unit 80. In step S155, the display unit 90 displays the object information and the text information associated with the time point information corresponding to the event occurrence time point at which the word matching the keyword was detected such that the object information and the text information are distinguished from other object information and other text information.

When the information recording system 10c does not include the sound output unit 100 and the recording unit 60 does not record sound information, the recording unit 60 records object information, image information, text information, a conversion candidate word, and time point information on the recording medium 70 such that the object information, the image information, the text information, the conversion candidate word, and the time point information are associated with each other in step S115. In step S140, the event detection unit 75 detects an event on the basis of at least one piece of the object information and the image information recorded on the recording medium 70. In step S145, the reading unit 80 reads the object information, the image information, and the text information associated with the time point information corresponding to the event occurrence time point from the recording medium 70. In step S150, the display unit 90 displays the object information, the image information, and the text information read by the reading unit 80 such that the object information, the image information, and the text information are associated with each other. In step S155, the display unit 90 displays the object information, the image information, and the text information associated with the time point information corresponding to the event occurrence time point at which the word matching the keyword was detected such that the object information, the image information, and the text information are distinguished from other object information, other image information, and other text information.

As described above, the event is detected on the basis of at least one piece of the object information, the image information, and the sound information recorded on the recording medium 70. Information associated with the time point information corresponding to the event occurrence time point at which the word matching the keyword within the information corresponding to the event was detected is displayed such that the information is distinguished from other information. Thereby, the information recording system 10c can support efficient information viewing of the user.

According to the above-described method, the information recording system 10c can extract a useful scene to which the user pays attention and a list of information about the scene from a plurality of pieces of and a large amount of information recorded at an observation site. Also, the information recording system 10c can extract information corresponding to a keyword from the list. Therefore, the user can efficiently view information about an event occurring at a timing when the user pays attention.

A specific example of event detection of the event detection unit 75 will be described below.

Figure 11:
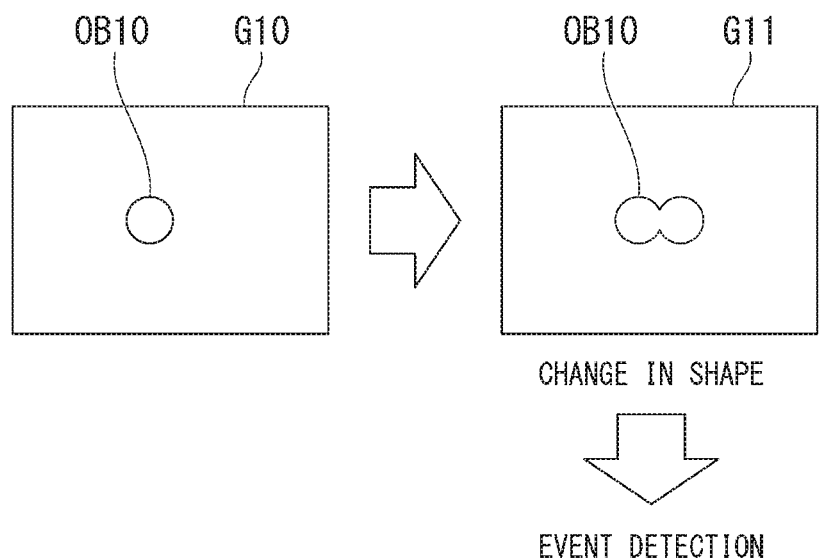
FIG. 11 is a reference diagram showing event detection based on object information in the information recording system according to the third modified example of the first embodiment of the present invention.
Figure 12:
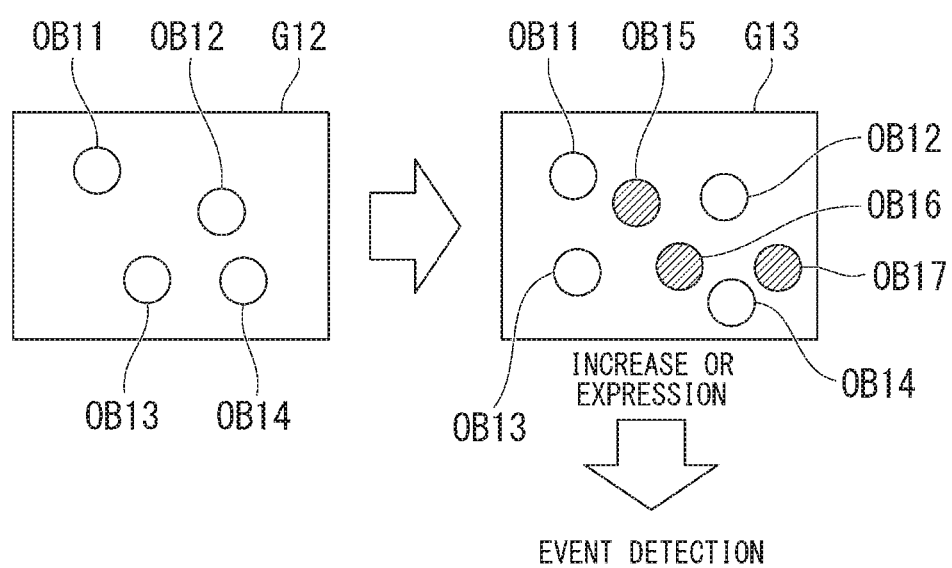
FIG. 12 is a reference diagram showing event detection based on object information in the information recording system according to the third modified example of the first embodiment of the present invention.

FIGS. 11 and 12 show examples of event detection based on the object information. In FIGS. 11 and 12, the object information is image information (a microscope image) of the object acquired by the camera connected to the microscope.

As shown in FIG. 11, an object OB10 is included in an image G10. An image G11 is captured at a time point later than that when the image G10 was captured. The object OB10 is included in the image G11. The shape of the object OB10 is different between the image G10 and the image G11. That is, the shape of the object OB10 varies with time. When the shape of the object OB10 has changed, the event detection unit 75 detects an event. For example, the event detection unit 75 determines whether or not an event in which the shape of the object OB10 changes has occurred by comparing image information of a plurality of frames acquired at different time points.

As shown in FIG. 12, an object OB11, an object OB12, an object OB13, and an object OB14 are included in an image G12. An image G13 is captured at a time point later than a time point when the image G12 was captured. In addition to the objects OB11 to OB14, an object OB15, an object OB16, and an object OB17 are included in the image G13. The objects OB15 to OB17 are added between the image G12 and the image G13. That is, the number of objects varies with time. When the number of objects has changed, the event detection unit 75 detects an event. For example, the event detection unit 75 determines whether or not an event in which the number of objects changes has occurred by comparing image information of a plurality of frames acquired at different time points.

When a state of the object indicated by the object information is a state predefined as an event detection condition, the event detection unit 75 detects the event. For example, the event detection condition is recorded on the recording medium 70 in advance. The reading unit 80 reads the event detection condition from the recording medium 70. The event detection unit 75 detects an event on the basis of the event detection condition read by the reading unit 80. Thereby, the event detection unit 75 can detect a phenomenon that the object is in a predetermined state as the event.

The image acquisition unit 30 acquires image information including an image of at least one of the object and surroundings of the object. When at least one state of the object and the surroundings of the object indicated by the image information is a state predefined as the event detection condition, the event detection unit 75 detects the event. For example, when a feature of the image information is the same as a feature predefined as the event detection condition, the event detection unit 75 detects the event. For example, in a microscope system using a multiphoton excitation fluorescence microscope, the event detection unit 75 detects an event when it is detected that light has entered a dark room from the image information. For example, in the examination system 13, the event detection unit 75 detects an event when a state such as bleeding or seizure of a patient is detected from image information. For example, feature information indicating the above-described feature is recorded on the recording medium 70 in advance as an event detection condition. The event detection unit 75 extracts the feature information from the image information. The reading unit 80 reads the event detection condition from the recording medium 70. The event detection unit 75 compares the feature information extracted from the image information with the feature information that is the event detection condition read by the reading unit 80. When the feature information extracted from the image information is the same as or similar to the feature information as the event detection condition, the event detection unit 75 detects the event. Thereby, the event detection unit 75 can detect a phenomenon that the observation state indicated by the image information becomes a predetermined state as an event.

Figure 13:
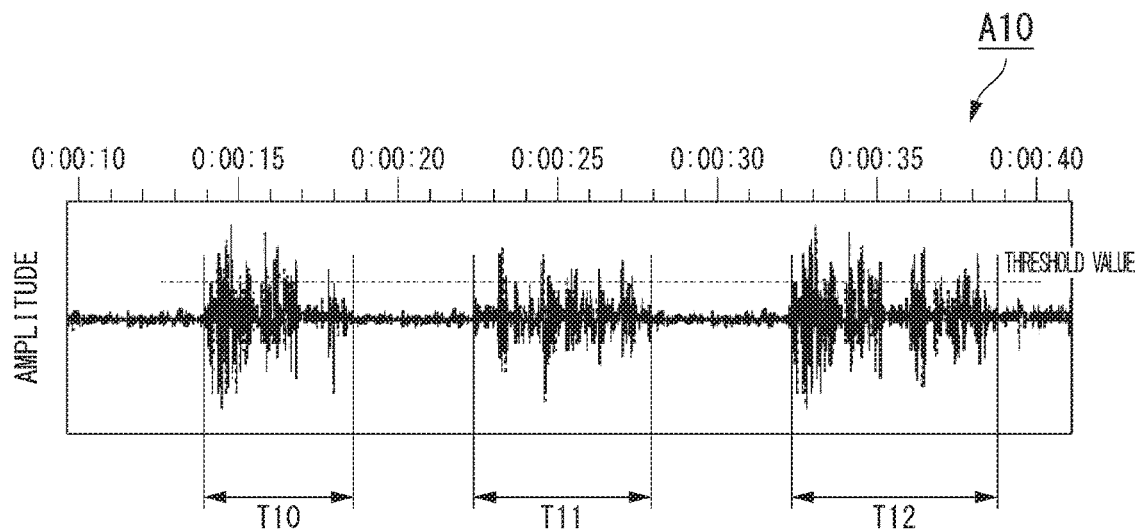
FIG. 13 is a reference diagram showing event detection based on sound information in the information recording system according to the third modified example of the first embodiment of the present invention.
Figure 14:
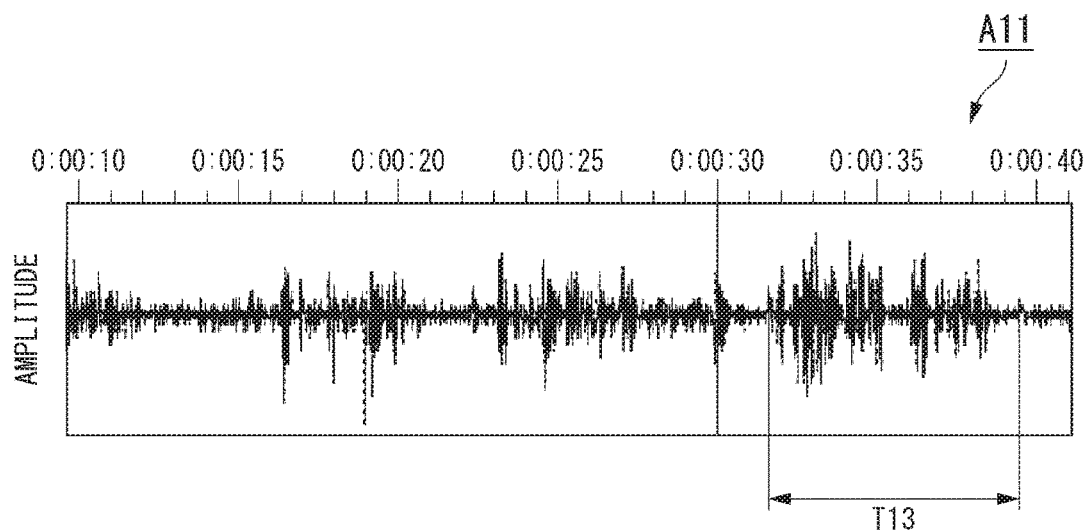
FIG. 14 is a reference diagram showing event detection based on sound information in the information recording system according to the third modified example of the first embodiment of the present invention.

FIGS. 13 and 14 show examples of event detection based on sound information. In FIGS. 13 and 14, the sound information is a time-series sound signal (sound data). The sound signal includes amplitude information of the sound at each of the plurality of time points. FIG. 13 shows a graph of a sound signal A10 and FIG. 14 shows a graph of a sound signal A11. In the graphs of FIGS. 13 and 14, the horizontal direction represents time and the vertical direction represents amplitude.

The sound signal A10 shown in FIG. 13 is a sound during an inspection with an industrial endoscope. For example, the amplitude of the sound signal exceeds a threshold value during a period T10, a period T11, and a period T12 shown in FIG. 13. The threshold value is greater than zero. The user is an inspector. For example, during the period T10, the user utters a sound indicating that there is a scratch at a position of 250 mm. For example, during the period T11, the user utters a sound indicating that there is a hole with a diameter of 5 mm at a position of 320 mm. For example, during the period T12, the user utters a sound indicating that there is rust at a position of 470 mm. When the amplitude of the sound signal exceeds the predetermined threshold value, the event detection unit 75 detects the event. Even when the user has uttered a series of sounds, a sound signal at that time includes a period with small amplitude. When a plurality of events are continuously detected within a predetermined time, the event detection unit 75 may aggregate the plurality of events as one event. Alternatively, the event detection unit 75 may use an average value of amplitudes within a predetermined time or the like as a representative value and detect the presence or absence of an event at predetermined time intervals. In this manner, the event detection unit 75 detects the event during the period T10, the period T11, and the period T12 corresponding to a period during which the user has uttered the sound.

The threshold value may be smaller than zero. If the amplitude of the sound signal is smaller than the threshold value smaller than 0, the amplitude of the sound signal exceeds the threshold value. When the power of the sound signal exceeds a predetermined threshold value, the event detection unit 75 may detect the event. For example, the power of the sound signal is a square mean value of the amplitude.

As described above, the sound acquisition unit 40 acquires sound information based on the sound uttered by the observer who observes the object. The sound information is a time-series sound signal. When the amplitude or the power of the sound signal exceeds the threshold value predefined as the event detection condition, the event detection unit 75 detects the event. For example, a threshold value determined on the basis of amplitude or power of predetermined sound information or a threshold value specified by a user who is the observer is recorded on the recording medium 70 in advance as the event detection condition. The reading unit 80 reads the event detection condition from the recording medium 70. The event detection unit 75 compares the amplitude or power of the sound signal acquired by the sound acquisition unit 40 with the threshold value which is the event detection condition read by the reading unit 80. When the amplitude or the power of the sound signal exceeds the threshold value, the event detection unit 75 detects the event. Thereby, the event detection unit 75 can detect a phenomenon when the user has uttered comments as the event.

The sound signal A11 shown in FIG. 14 is a sound during the inspection with a medical endoscope. The user is a doctor. For example, during the period T13 shown in FIG. 14, the user utters a word "polyp". When the word "polyp" is registered as a keyword for event detection in advance, the event detection unit 75 detects an event during the period T13.

As described above, the sound acquisition unit 40 acquires sound information based on the sound uttered by the observer who observes the object. When the sound indicated by the sound information is the same as the sound of the keyword predefined as the event detection condition, the event detection unit 75 detects the event. For example, the sound information generated by acquiring the sound of the keyword is recorded on the recording medium 70 in advance as the event detection condition. The reading unit 80 reads the event detection condition from the recording medium 70. The event detection unit 75 compares the sound information acquired by the sound acquisition unit 40 with the sound information that is the event detection condition read by the reading unit 80. For example, when the two pieces of the sound information are the same, i.e., when the similarity between the two pieces of the sound information is greater than or equal to a predetermined value, the event detection unit 75 detects the event. Thereby, the event detection unit 75 can detect a phenomenon when the user who is the observer utters a predetermined keyword as the event.

In the observation site, in many cases, the user recognizes the state of the object or the observation situation and utters comments with respect to the state of the object or the observation situation. Thus, when the event detection unit 75 detects an event on the basis of the sound information, the event detection unit 75 can more easily detect the event to which the user pays attention.

Figure 15:
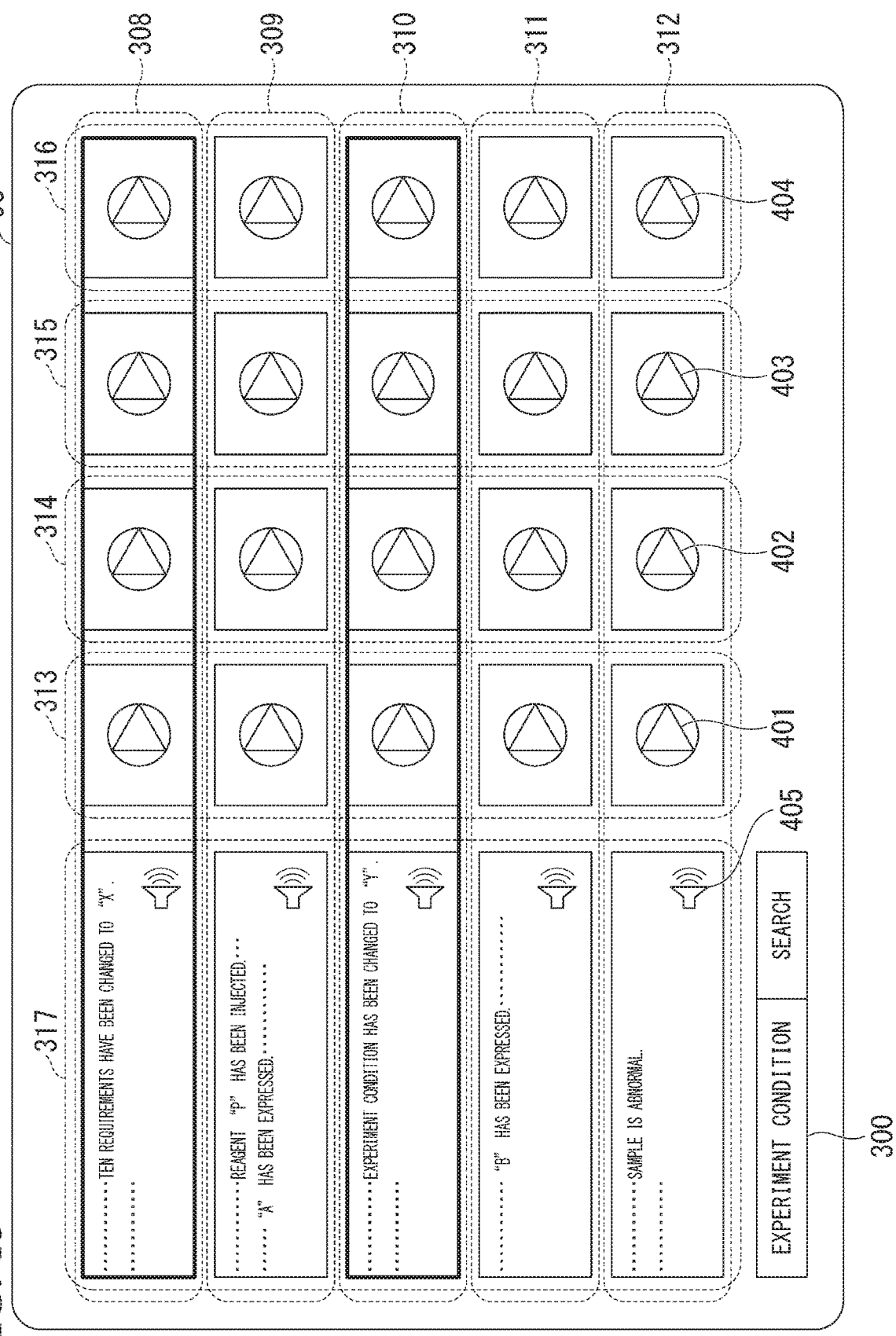
FIG. 15 is a reference diagram showing a screen of a display unit in the information recording system according to the third modified example of the first embodiment of the present invention.

A specific example of display of information by the display unit 90 will be described below. FIG. 15 shows a window W10 displayed on a screen 93 of the display unit 90.

The event detection unit 75 detects an event on the basis of at least one piece of the object information, the image information, and the sound information recorded on the recording medium 70. The reading unit 80 reads the object information, the image information, and the text information associated with the time point information corresponding to the event occurrence time point from the recording medium 70. The display unit 90 displays the object information, the image information, and the text information read by the reading unit 80 such that the object information, the image information, and the text information are associated with each other.

The event detection unit 75 detects a plurality of event occurrence time points. The reading unit 80 reads the object information, the image information, and the text information associated with time point information corresponding to each of the plurality of event occurrence time points from the recording medium 70. The display unit 90 displays the object information, the image information, and the text information read by the reading unit 80 at each event occurrence time point such that the object information, the image information, and the text information are associated with each other. In the present example, information in the observation with the microscope system 11 shown in FIG. 3 is shown.

In FIG. 15, object information, image information, and text information corresponding to five events among a plurality of events are shown. Object information, image information, and text information corresponding to the same event are displayed such that the object information, the image information, and the text information are associated with each other. The object information, the image information, and the text information corresponding to the same event are arranged in the horizontal direction. The object information, the image information, and the text information in each event are associated with the same position of the vertical direction. The object information, the image information, and the text information corresponding to an event 1 are displayed in a region 308 of the screen 93. The object information, the image information, and the text information corresponding to an event 2 are displayed in a region 309 of the screen 93. The object information, the image information, and the text information corresponding to an event 3 are displayed in a region 310 of the screen 93. The object information, the image information, and the text information corresponding to an event 4 are displayed in a region 311 of the screen 93. The object information, the image information, and the text information corresponding to an event 5 are displayed in a region 312 of the screen 93.

The object information is an image generated by a camera connected to the microscope 200. The object information is displayed in a region 313 of the screen 93. The image information is displayed in a region 314, a region 315, and a region 316 of the screen 93. Image information generated by the camera 31a for photographing the vicinity of the tip of the objective lens of the microscope is displayed in the region 314. Image information generated by the camera 31b for photographing all of the object OB1 and the microscope 200 is displayed in the region 315. Image information generated by the camera 31c attached to the user is displayed in the region 316. Text information is displayed in a region 317 of the screen 93.

When the object information recorded on the recording medium 70 is divided into a plurality of pieces in a time series, the reading unit 80 reads object information associated with the time point information within the event period corresponding to the event occurrence time point from the recording medium 70. The display unit 90 displays the object information read by the reading unit 80. For example, when the user has operated an icon 401, the display unit 90 displays a moving image of the object during the event period. The reading unit 80 may read representative object information associated with the time point information corresponding to the event occurrence time point from the recording medium 70. The display unit 90 may display the representative object information read by the reading unit 80. For example, the representative object information is image information of an object of one frame generated at a time point closest to the event occurrence time point. The representative object information may be a thumbnail of one frame generated at the time point closest to the event occurrence time point.

When the image information recorded on the recording medium 70 is divided into a plurality of pieces in a time-series, the reading unit 80 reads the image information associated with the time point information within the event period corresponding to the event occurrence time point from the recording medium 70. The display unit 90 displays the image information read by the reading unit 80. For example, when the user has operated any one of an icon 402, an icon 403, and an icon 404, the display unit 90 displays a moving image showing an observation situation during the event period. The reading unit 80 may read representative image information associated with the time point information corresponding to the event occurrence time point from the recording medium 70. The display unit 90 may display representative image information read by the reading unit 80. For example, the representative image information is image information of one frame generated at the time point closest to the event occurrence time point. The representative image information may be a thumbnail of one frame generated at the time point closest to the event occurrence time point.

The reading unit 80 reads the sound information associated with the time point information corresponding to the event occurrence time point from the recording medium 70. The sound output unit 100 outputs a sound based on the sound information read by the reading unit 80. For example, the reading unit 80 reads the sound information associated with the time point information within the event period corresponding to the event occurrence time point from the recording medium 70. For example, when the user has operated an icon 405, the sound output unit 100 outputs a sound during the event period.

The description of the event period in the first embodiment can be applied to the description of the event period in the third modified example of the first embodiment. An utterance time point in the above description is replaced with the event occurrence time point.

After the information of each event shown in FIG. 15 is displayed, the user can input a keyword to a keyword input field 300 by operating an operation unit. When the keyword is input to the keyword input field 300, the keyword reception unit 55 receives the keyword input to the keyword input field 300. In the example shown in FIG. 15, the term "experiment condition" is input as the keyword to the keyword input field 300.

The search unit 65 searches for the keyword received by the keyword reception unit 55 in the text information and the conversion candidate word associated with the time point information within the event period. That is, the search unit 65 searches for the keyword in the text information displayed by the display unit 90 and the conversion candidate word associated with the word within the text information. The search unit 65 extracts the word matching the keyword from the word (the determined word) within the text information and the conversion candidate word. The display unit 90 displays the object information, the image information, and the text information within an event period corresponding to the time point information corresponding to an event occurrence time point at which the word matching the keyword was detected such that the object information, the image information, and the text information are distinguished from other object information, other image information, and other text information.

In the example shown in FIG. 15, the text information corresponding to the event 1 does not include the keyword "experiment condition", but includes the term "ten requirements" which is an erroneous recognition result. Also, conversion candidate words associated with the text information corresponding to the event 1 include the keyword "experiment condition". The text information corresponding to the event 3 includes the keyword "experiment condition". Thus, the display unit 90 displays the object information, the image information, and the text information corresponding to each of the event 1 and the event 3 such that they are distinguished from the object information, the image information, and the text information corresponding to each of the event 2, the event 4, and the event 5. Specifically, the display unit 90 displays the object information, the image information, and the text information corresponding to each of the event 1 and the event 3 such that they are emphasized more than the object information, the image information, and the text information corresponding to each of the event 2, the event 4, and the event 5. For example, the object information, the image information, and the text information corresponding to each of the event 1 and the event 3 are surrounded by thick lines.

The display unit 90 may brightly display the object information, the image information, and the text information corresponding to each of the event 1 and the event 3. The display unit 90 may enlarge and display the object information, the image information, and the text information corresponding to each of the event 1 and the event 3. A method of distinguishing information of an event corresponding to an event occurrence time point at which a word matching a keyword was detected from information of another event is not limited to the above-described method.

The display unit 90 may display the word that is within the text information and matches the keyword such that the word is distinguished from other words within the text information and display the word that is within the text information and is associated with the conversion candidate word matching the keyword such that the word is distinguished from other words within the text information.

As described above, information associated with the time point information corresponding to the event occurrence time point at which the word matching the keyword within the information corresponding to the event was detected is displayed such that the information is distinguished from other information. Thus, the user can easily recognize information corresponding to a desired keyword. Also, the word corresponding to the keyword in the text information is displayed such that the word is distinguished from other words and therefore the user can easily check a search result.

The information recording system 10c may include a situation information acquisition unit 110 in the information recording system 10a shown in FIG. 7. When the situation indicated by situation information is a state predefined as an event detection condition, the event detection unit 75 may detect an event. For example, the situation information is surrounding environment information acquired from a thermometer, i.e., a temperature. When the temperature indicated by the situation information exceeds a threshold value predefined as the event detection condition, the event detection unit 75 detects an event. For example, a threshold value specified by the user is recorded on the recording medium 70 in advance as the event detection condition. The reading unit 80 reads the event detection condition from the recording medium 70. The event detection unit 75 compares the temperature indicated by the situation information acquired by the situation information acquisition unit 110 with the threshold value that is the event detection condition read by the reading unit 80. When the temperature exceeds the threshold value, the event detection unit 75 detects an event.

Second Embodiment

Figure 16:
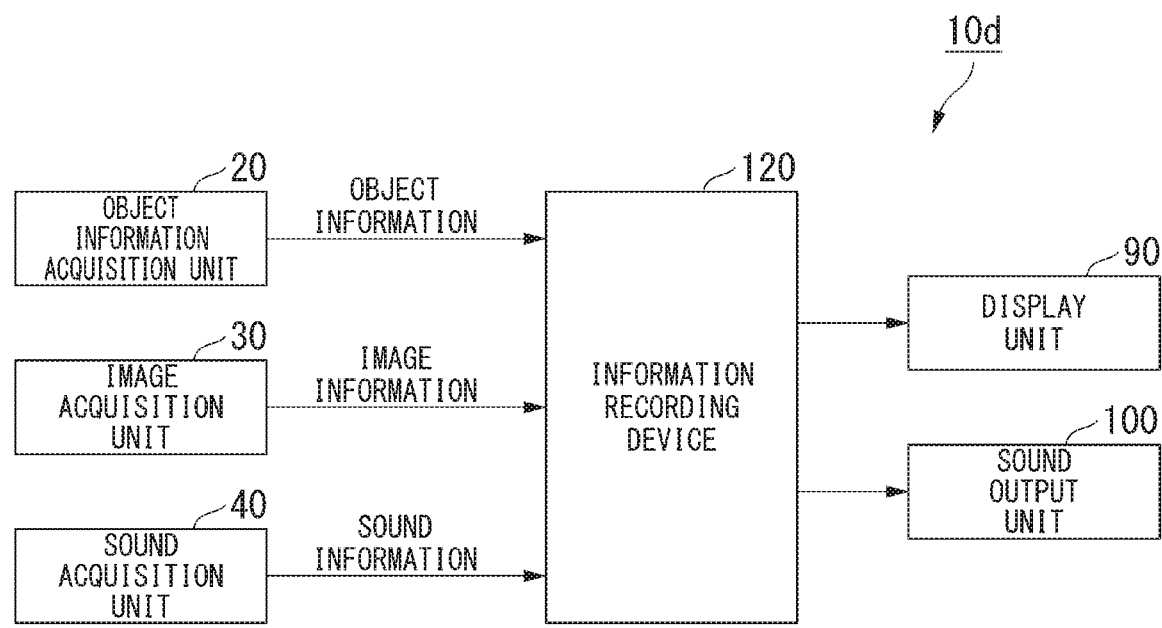
FIG. 16 is a block diagram showing a configuration of an information recording system according to a second embodiment of the present invention.

FIG. 16 shows a configuration of an information recording system 10d according to a second embodiment of the present invention. In terms of the configuration shown in FIG. 16, differences from the configuration shown in FIG. 1 will be described.

As shown in FIG. 16, the information recording system 10d includes an object information acquisition unit 20, an image acquisition unit 30, a sound acquisition unit 40, an information recording device 120, a display unit 90, and a sound output unit 100. Configurations of the object information acquisition unit 20, the image acquisition unit 30, the sound acquisition unit 40, the display unit 90, and the sound output unit 100 are similar to those corresponding to the components shown in FIG. 1. In the information recording system 10d shown in FIG. 16, the sound processing unit 50, the keyword reception unit 55, the recording unit 60, the search unit 65, the recording medium 70, and the reading unit 80 in the information recording system 10 shown in FIG. 1 are changed to the information recording device 120.

In terms of points other than the above, the configuration shown in FIG. 16 is similar to the configuration shown in FIG. 1.

Figure 17:
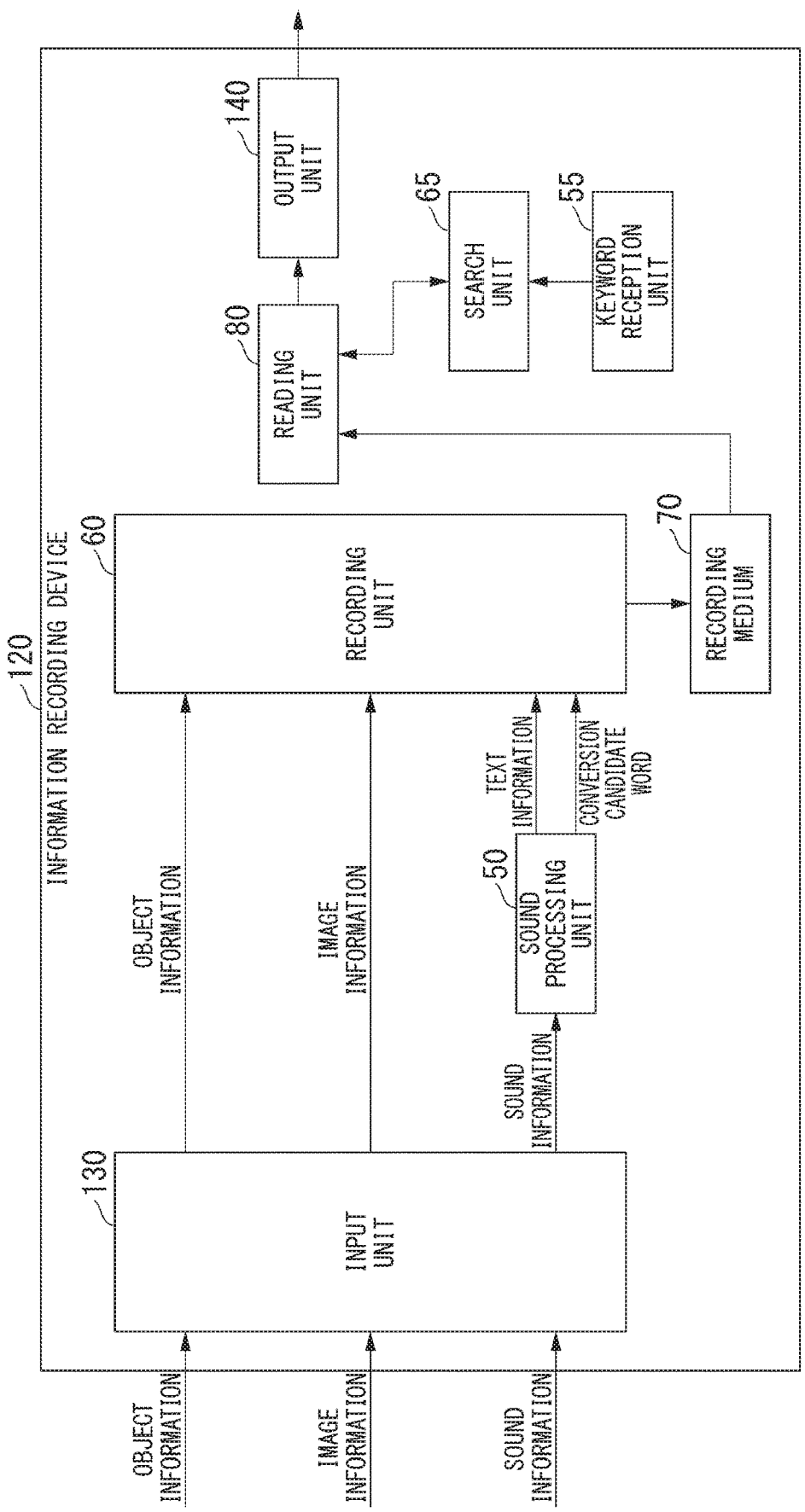
FIG. 17 is a block diagram showing a configuration of an information recording device according to the second embodiment of the present invention.

FIG. 17 shows a configuration of the information recording device 120. As shown in FIG. 17, the information recording device 120 includes a sound processing unit 50, a keyword reception unit 55, a recording unit 60, a search unit 65, a recording medium 70, a reading unit 80, an input unit 130, and an output unit 140.

The configurations of the sound processing unit 50, the keyword reception unit 55, the recording unit 60, the search unit 65, the recording medium 70, and the reading unit 80 are similar to those corresponding to the components shown in FIG. 1. Object information from the object information acquisition unit 20, image information from the image acquisition unit 30, and sound information from the sound acquisition unit 40 are input to the input unit 130. For example, at least one of the object information acquisition unit 20, the image acquisition unit 30, and the sound acquisition unit 40 is connected to the information recording device 120 through a cable. In this case, the input unit 130 is an input terminal to which the cable is connected. At least one of the object information acquisition unit 20, the image acquisition unit 30, and the sound acquisition unit 40 may be wirelessly connected to the information recording device 120. In this case, the input unit 130 is a wireless communication circuit that wirelessly communicates with at least one of the object information acquisition unit 20, the image acquisition unit 30, and the sound acquisition unit 40.

The output unit 140 outputs the object information, the image information, the sound information, and the text information read by the reading unit 80. That is, the output unit 140 outputs the object information, the image information, and the text information to the display unit 90 and outputs the sound information to the sound output unit 100. For example, at least one of the display unit 90 and the sound output unit 100 is connected to the information recording device 120 through a cable. In this case, the output unit 140 is an output terminal to which the cable is connected. At least one of the display unit 90 and the sound output unit 100 may be wirelessly connected to the information recording device 120. In this case, the output unit 140 is a wireless communication circuit that wirelessly communicates with at least one of the display unit 90 and the sound output unit 100.

The information recording device 120 may read a program and execute the read program. That is, the function of the information recording device 120 may be implemented by software. This program includes instructions for defining the operations of the sound processing unit 50, the recording unit 60, the search unit 65, and the reading unit 80. For example, this program may be provided by a "computer-readable recording medium" such as a flash memory. Also, the above-described program may be transmitted from a computer having a storage device or the like in which the program is stored to the information recording device 120 via a transmission medium or transmission waves in the transmission medium. The "transmission medium" for transmitting the program refers to a medium having an information transmission function, for example, a network (a communication network) such as the Internet or a communication circuit (a communication line) such as a telephone circuit. Also, the above-described program may be a program for implementing some of the above-described functions. Further, the above-described program may be a program capable of implementing the above-described function in combination with a program already recorded on the computer, i.e., a so-called differential file (differential program).

Various modifications applied to the information recording system 10 shown in FIG. 1 may be similarly applied to the information recording system 10d shown in FIG. 16. For example, the information recording system 10d may not include the image acquisition unit 30. In this case, the object information and the sound information are input to the input unit 130. The recording unit 60 records the object information, the sound information, the text information, the conversion candidate word, and the time point information on the recording medium 70 such that the object information, the sound information, the text information, the conversion candidate word, and the time point information are associated with each other. The reading unit 80 reads the object information and the text information associated with the time point information corresponding to the word matching the keyword from the recording medium 70. The output unit 140 outputs the object information, the sound information, and the text information read by the reading unit 80. The display unit 90 displays the object information and the text information output by the output unit 140 such that the object information and the text information are associated with each other. The text information may not be output from the information recording device 120. The sound output unit 100 outputs a sound based on the sound information output by the output unit 140.

The information recording system 10d does not include the sound output unit 100 and the recording unit 60 may not record sound information. In this case, the object information, the image information, and the sound information are input to the input unit 130. The recording unit 60 records the object information, the image information, the text information, the conversion candidate word, and the time point information on the recording medium 70 such that the object information, the image information, the text information, the conversion candidate word, and the time point information are associated with each other. The reading unit 80 reads the object information, the image information, and the text information associated with the time point information corresponding to the word matching the keyword from the recording medium 70. The output unit 140 outputs the object information, the image information, and the text information read by the reading unit 80. The display unit 90 displays the object information, the image information, and the text information output by the output unit 140 such that the object information, the image information, and the text information are associated with each other. No text information may be output from the information recording device 120.

Figure 18:
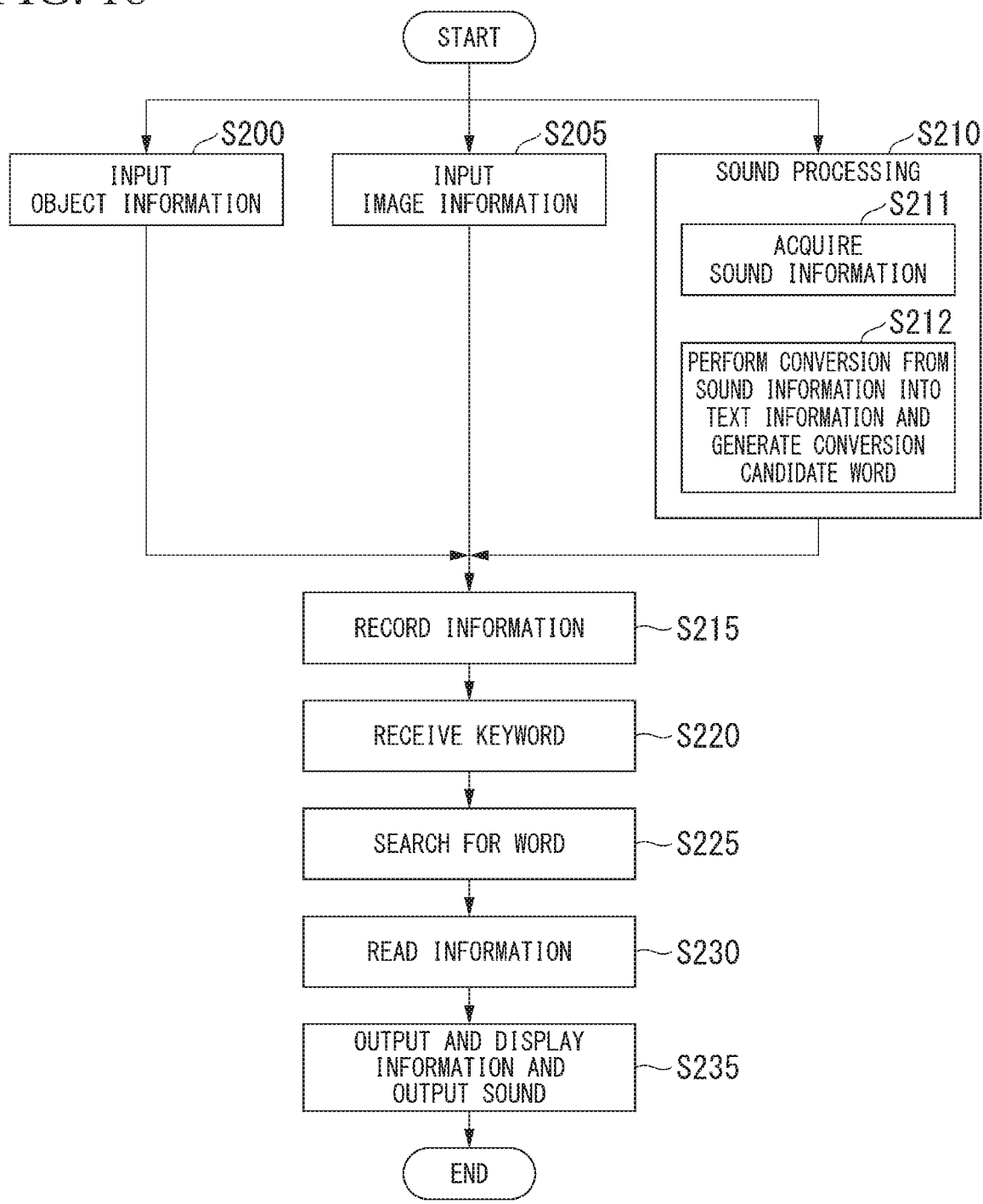
FIG. 18 is a flowchart showing a procedure of processing of the information recording device according to the second embodiment of the present invention.

FIG. 18 shows a procedure of processing of the information recording device 120. The procedure of processing of the information recording device 120 will be described with reference to FIG. 18.

Object information about the object is input to the input unit 130 (step S200 (an input step)). The object information input in step S200 is stored in a buffer within the recording unit 60. In parallel with the input of the object information to the input unit 130, image information indicating a type of situation in which the object information was acquired is input to the input unit 130 (step S205 (an input step)). The image information input in step S205 is stored in the buffer within the recording unit 60. In parallel with the input of the object information to the input unit 130, the processing in step S210 is performed. Step S210 includes step S211 (a sound input step) and step S212 (a sound processing step). In step S211, sound information based on a sound uttered by an observer who observes the object is input to the input unit 130. In step S212, the sound processing unit 50 converts the sound information input to the input unit 130 into text information and generates at least one conversion candidate word corresponding to the sound in the process of converting the sound information into the text information. In step S210, the processing in steps S211 and S212 is iterated. The sound information input in step S211, the text information generated in step S212, and the conversion candidate word generated in step S212 are stored in the buffer within the recording unit 60.

Processing start timings of step S200, step S205, and step S210 may not be the same. Processing end timings of step S200, step S205, and step S210 may not be the same. At least some of periods during which the processing in step S200, step S205, and step S210 is performed overlap each other.

After the input of the object information, the image information, and the sound information is completed, the recording unit 60 records the object information, the image information, the sound information, the text information, the conversion candidate word, and the time point information stored in the buffer within the recording unit 60 on the recording medium 70 such that the object information, the image information, the sound information, the text information, the conversion candidate word, and the time point information are associated with each other (step S215 (a recording step)).

After step S215, the keyword reception unit 55 receives a keyword (step S220 (a keyword reception step)).

After step S220, the search unit 65 searches for the keyword received by the keyword reception unit 55 in the text information and the conversion candidate word, and extracts a word matching the keyword from words within the text information and the conversion candidate word (step S225 (a search step)).

After step S225, the reading unit 80 reads the object information, the image information, the sound information, and the text information associated with the time point information corresponding to the word matching the keyword from the recording medium 70 (step S230 (a reading step)). The user may be able to specify a timing at which the information is read.

After step S230, the output unit 140 outputs the object information, the image information, the sound information, and the text information read by the reading unit 80. The display unit 90 displays the object information, the image information, and the text information output by the output unit 140 such that the object information, the image information, and the text information are associated with each other. Also, the sound output unit 100 outputs a sound based on the sound information output by the output unit 140 (step S235 (an output step, a display step, and a sound output step)).

When the information recording system 10*d* does not include the image acquisition unit 30, the processing in step S205 is not performed. Also, in step S215, the recording unit 60 records the object information, the sound information, the text information, the conversion candidate word, and the time point information on the recording medium 70 such that the object information, the sound information, the text information, the conversion candidate word, and the time point information are associated with each other. In step S230, the reading unit 80 reads the object information, the sound information, and the text information associated with the time point information corresponding to the word matching the keyword from the recording medium 70. In step S235, the output unit 140 outputs the object information, the sound information, and the text information read by the reading unit 80 in step S230. Also, in step S235, the display unit 90 displays the object information and the text information output by the output unit 140 such that the object information and the text information are associated with each other. No text information may be output from the information recording device 120. Also, in step S235, the sound output unit 100 outputs a sound based on the sound information read by the reading unit 80 in step S230.

When the information recording system 10*d* does not include the sound output unit 100 and the recording unit 60 does not record sound information, the recording unit 60 records the object information, the image information, the text information, the conversion candidate word, and the time point information on the recording medium 70 such that the object information, the image information, the text information, the conversion candidate word, and the time point information are associated with each other in step S215. In step S230, the reading unit 80 reads the object information, the image information, and the text information associated with the time point information corresponding to the word matching the keyword from the recording medium 70. In step S235, the output unit 140 outputs the object information, the image information, and the text information read by the reading unit 80 in step S230. Also, in step S235, the display unit 90 displays the object information, the image information, and the text information output by the output unit 140 such that the object information, the image information, and the text information are associated with each other. No text information may be output from the information recording device 120.

At least one of the sound processing unit 50 and the recording medium 70 may be disposed outside the information recording device 120. When the sound processing unit 50 is disposed outside the information recording device 120, the text information from the sound processing unit 50 is input to the input unit 130. The recording medium 70 may be attachable to and detachable from the information recording device 120. The information recording device 120 may have a network interface and the information recording device 120 may be connected to the recording medium 70 via a network. The information recording device 120 may have a wireless communication interface and the information recording device 120 may be connected to the recording medium 70 through wireless communication.

The information recording device 120 may not include the output unit 140. For example, the recording medium 70 is configured so that the recording medium 70 can be attached to and detached from the information recording device 120. The reading unit 80 reads the object information, the image information, the sound information, and the text information associated with the time point information corresponding to the word matching the keyword from the recording medium 70. The recording unit 60 records the object information, the image information, the sound information, and the text information read by the reading unit 80 on the recording medium 70 such that the object information, the image information, the sound information, and the text information are associated with each other. When the recording medium 70 is detached from the information recording device 120 and is attached to a device outside the information recording device 120, the device can use the information recorded on the recording medium 70. When the information recording device 120 does not include the output unit 140, the information recording device 120 does not perform the processing in step S235.

As described above, object information is input to the input unit 130 and image information indicating a type of situation in which the object information was acquired is input to the input unit 130. The input object information and image information are recorded on the recording medium 70 by the recording unit 60. Thereby, the information recording device 120 can record visual information indicating a type of situation in which the object information was acquired.

As described above, the conversion candidate word generated in the process of converting the sound information into the text information is recorded on the recording medium 70 by the recording unit 60. The search unit 65 searches for a keyword received by the keyword reception unit 55 in the text information and the conversion candidate word and extracts a word matching the keyword from the words within the text information and the conversion candidate word. Even when a word erroneously recognized in the sound recognition process cannot be extracted from the text information during a search, the search unit 65 can extract a desired word from the conversion candidate word corresponding to the erroneously recognized word. Therefore, the information recording device 120 can reduce omissions in a word search in the text information. As a result, the information recording device 120 can provide the user with the object information, the image information, the sound information, and the text information corresponding to the keyword received by the keyword reception unit 55. The effect obtained in the information recording system 10 of the first embodiment can be similarly obtained also in the information recording device 120 of the second embodiment.

The matters disclosed in the first to third modified examples of the first embodiment may be similarly applied to the information recording device 120 of the second embodiment. Therefore, the information recording system 10d may include the situation information acquisition unit 110 and the situation information acquired by the situation information acquisition unit 110 may be input to the input unit 130. Alternatively, the information recording device 120 may include an event detection unit 75.

Third Embodiment

Figure 19:
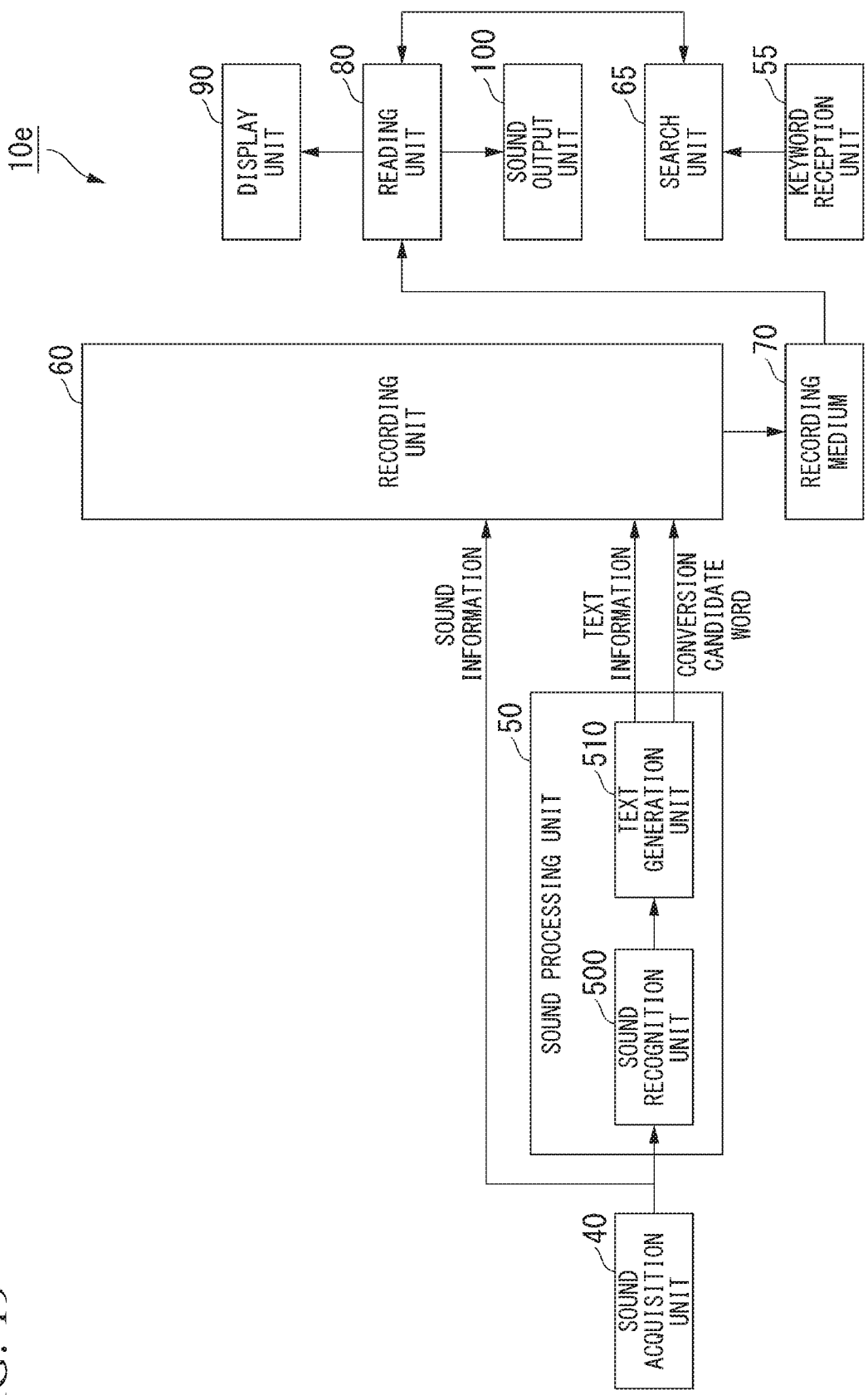
FIG. 19 is a block diagram showing a configuration of an information recording system according to a third embodiment of the present invention.

FIG. 19 shows a configuration of an information recording system 10e according to a third embodiment of the present invention. In terms of the configuration shown in FIG. 19, differences from the configuration shown in FIG. 1 will be described.

The information recording system 10e shown in FIG. 19 does not include the object information acquisition unit 20 and the image acquisition unit 30 in the information recording system 10 shown in FIG. 1. A recording unit 60 records sound information, text information, conversion candidate word, and time point information on a recording medium 70 such that the sound information, the text information, the conversion candidate word, and the time point information are associated with each other. A reading unit 80 reads text information including a first part corresponding to a word matching the keyword from the recording medium 70. A display unit 90 displays the text information read by the reading unit 80 such that the first part and a second part other than the first part can be distinguished.

Also, the reading unit 80 reads the sound information associated with the time point information corresponding to the word matching the keyword from the recording medium 70. A sound output unit 100 outputs a sound based on the sound information read by the reading unit 80.

The information recording system 10e may not include the sound output unit 100. In this case, the recording unit 60 records the text information and the conversion candidate word on the recording medium 70 such that the text information and the conversion candidate word are associated with each other. The reading unit 80 reads text information including the first part corresponding to the word matching the keyword from the recording medium 70. Because the conversion candidate word is associated with a determined word constituting the text information, no time point information may be recorded.

In terms of points other than the above, the configuration shown in FIG. 19 is similar to the configuration shown in FIG. 1.

Figure 20:
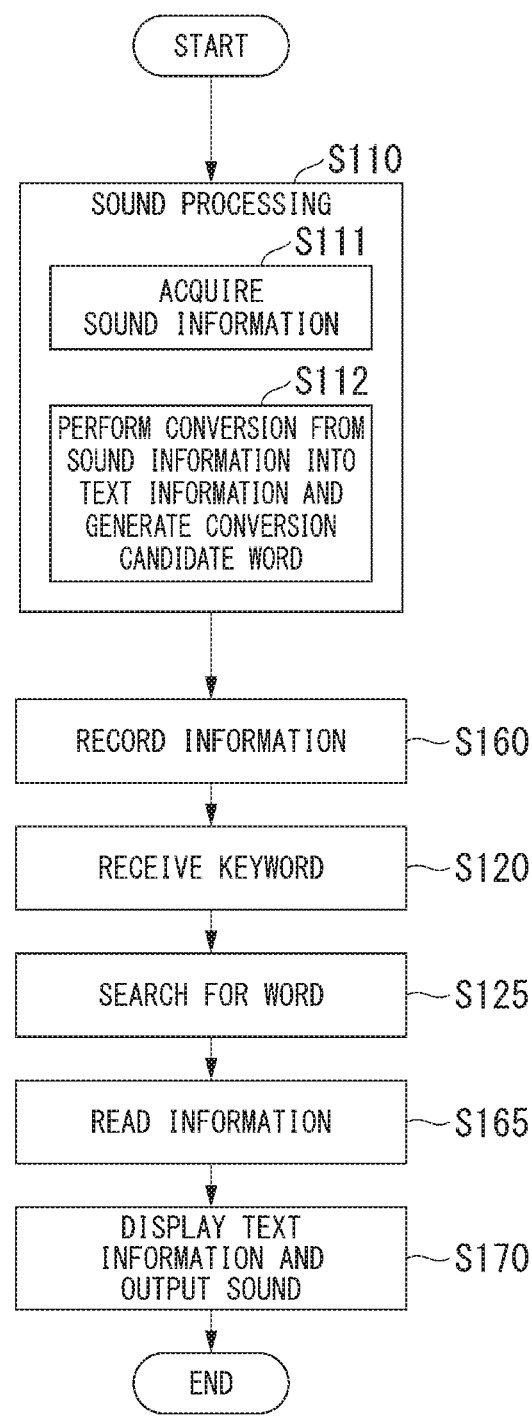
FIG. 20 is a flowchart showing a procedure of processing of the information recording system according to the third embodiment of the present invention.

FIG. 20 shows a procedure of processing of the information recording system 10c. In terms of the processing shown in FIG. 20, differences from the processing shown in FIG. 2 will be described.

The processing in steps S100 and S105 shown in FIG. 2 is not performed. After step S110, the recording unit 60 records sound information, text information, conversion candidate word, and time point information stored in the buffer in the recording unit 60 on the recording medium 70 such that the sound information, the text information, the conversion candidate word, and the time point information are associated with each other (step S160 (a recording step)).

After step S125, the reading unit 80 reads the text information including a first part corresponding to a word matching a keyword from the recording medium 70. Also, the reading unit 80 reads the sound information associated with the time point information corresponding to the word matching the keyword from the recording medium 70 (step S165 (a reading step)).

After step S165, the display unit 90 displays the text information read by the reading unit 80 such that the first part can be distinguished from the second part other than the first part. Also, the sound output unit 100 outputs a sound based on the sound information read by the reading unit 80 (step S170 (a display step and a sound output step)).

When the information recording system 10e does not include the sound output unit 100, the recording unit 60 records the text information and the conversion candidate word on the recording medium 70 such that the text information and the conversion candidate word are associated with each other in step S160. In step S165, the reading unit 80 reads text information including the first part corresponding to the word matching the keyword from the recording medium 70. In step S170, the display unit 90 displays the text information read by the reading unit 80 such that the first part and the second part other than the first part can be distinguished.

In terms of points other than the above, the processing shown in FIG. 20 is similar to the processing shown in FIG. 2.

Figure 21:
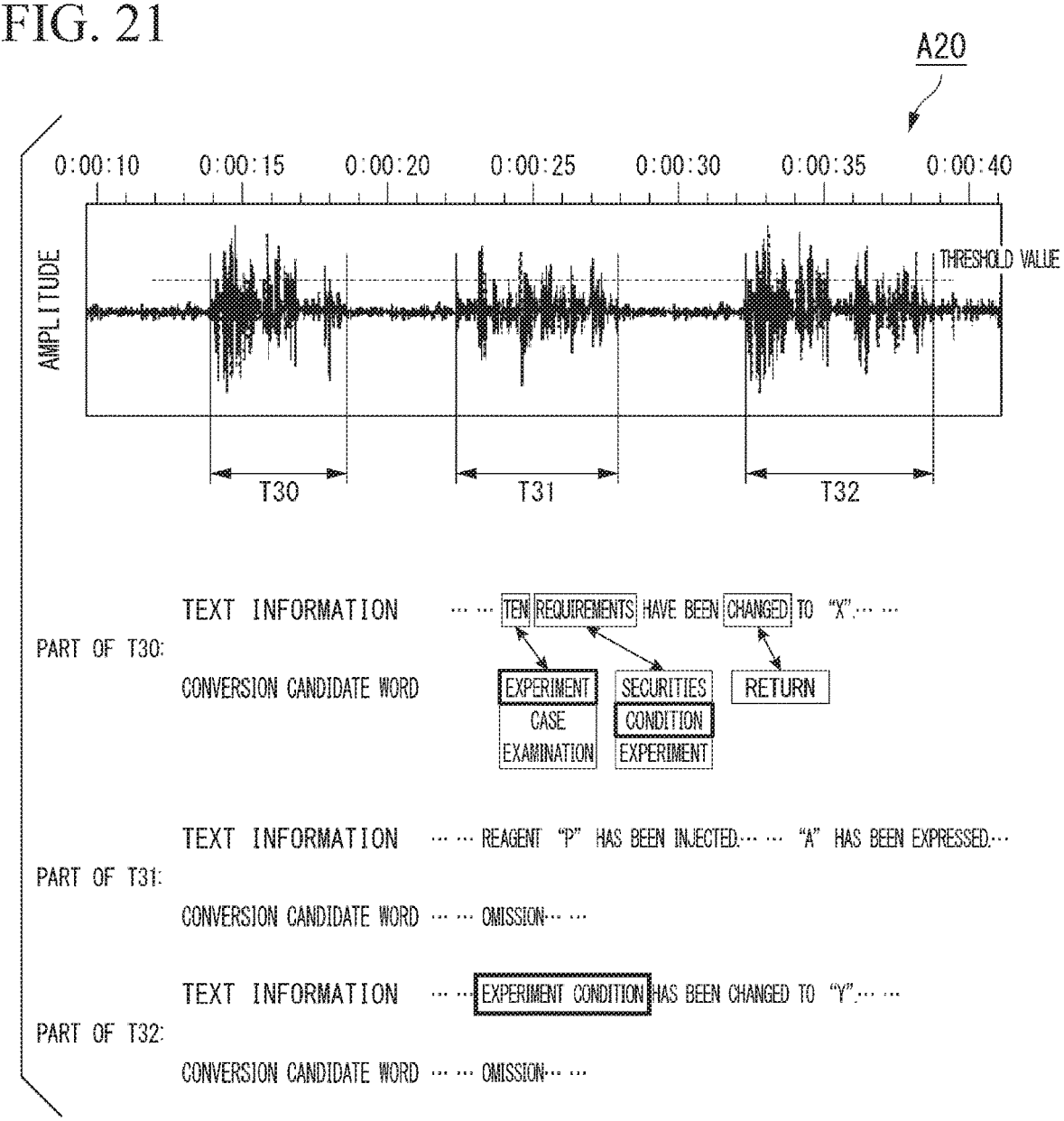
FIG. 21 is a reference diagram showing generation of determined words and conversion candidate words by a sound processing unit and a situation of a search by a search unit in the information recording system according to the third embodiment of the present invention.

An example of a search by a search unit 65 will be described with reference to FIG. 21. In FIG. 21, a graph of a sound signal A20 is shown. In the graph, the horizontal direction represents time and the vertical direction represents amplitude. During a period T30, a period T31, and a period T32, the amplitude of the sound signal exceeds the threshold value. During these periods, the user utters sounds.

From the text information associated with the time point information of the period T30, conversion candidate words are generated by a sound processing unit 50. In the example shown in FIG. 21, three conversion candidate words "experiment", "case", and "examination" are associated with the word "ten" within the text information which is a determined word. Likewise, three conversion candidate words "securities", "condition", and "experiment" are associated with the word "requirements" within the text information. Likewise, a conversion candidate word "return" is associated with the word "change" within the text information. The word "change" is pronounced as "henkou" in Japanese. The word "return" is pronounced as "hennou" in Japanese.

Likewise, conversion candidate words are generated by the sound processing unit 50 from the text information associated with the time point information of each of the period T30 and the period T31. In FIG. 21, these conversion candidate words are omitted.

When the keyword "experiment condition" is specified, the search unit 65 searches for the keyword in the text information and the conversion candidate word. The search unit 65 extracts a conversion candidate word matching the word "experiment" in the keyword and a conversion candidate word matching the word "condition" in the keyword from the conversion candidate words corresponding to the period T30. Also, the search unit 65 extracts words matching the term "experiment condition" within the keyword from the text information corresponding to the period T32.

Figure 22:
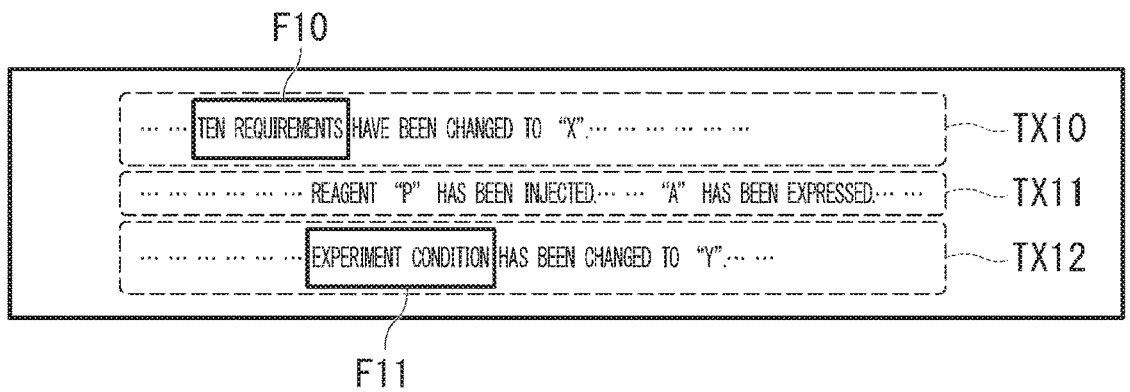
FIG. 22 is a reference diagram showing text information displayed by a display unit in the information recording system according to the third embodiment of the present invention.

FIG. 22 shows text information displayed by the display unit 90. The display unit 90 displays text information TX10 corresponding to the period T30, text information TX11 corresponding to the period T31, and text information TX12 corresponding to the period T32. The display unit 90 displays a frame F10 in the first part corresponding to the word matching the keyword in the text information TX10. The first part in the text information TX10 includes a determined word corresponding to a conversion candidate word matching the keyword. Also, the display unit 90 displays a frame F11 in the first part corresponding to the word matching the keyword in the text information TX12. The first part in the text information TX12 includes a determined word matching the keyword. In the text information TX10, a part other than the first part where the frame F10 is displayed constitutes a second part that does not include the word corresponding to the word matching the keyword. The text information TX11 constitutes the second part. In the text information TX12, a part other than the first part in which the frame F11 is displayed constitutes the second part.

The display unit 90 may display the first part in a first display form and the second part in a second display form different from the first display form. For example, the display unit 90 displays the first part such that the first part is emphasized more than the second part. For example, the display unit 90 displays the word within the first part in a color different from that of the word within the second part. The display unit 90 may display the word within the first part with characters thicker than those of the word within the second part. The display unit 90 may display the word within the first part with characters larger than those of the word within the second part. A method of distinguishing the first part from the second part is not limited to the above-described method.

The information recording system 10e can reduce omissions in a word search in text information. As a result, the information recording system 10e can provide the user with text information corresponding to the keyword received by a keyword reception unit 55.

As described above, the first part corresponding to the word matching the keyword and the second part other than the first part in the text information are distinguished and displayed. Thus, the user can easily check the search result.

The matters disclosed in the second modification of the first embodiment may be similarly applied to the information recording system 10c of the third embodiment.

Fourth Embodiment

Figure 23:
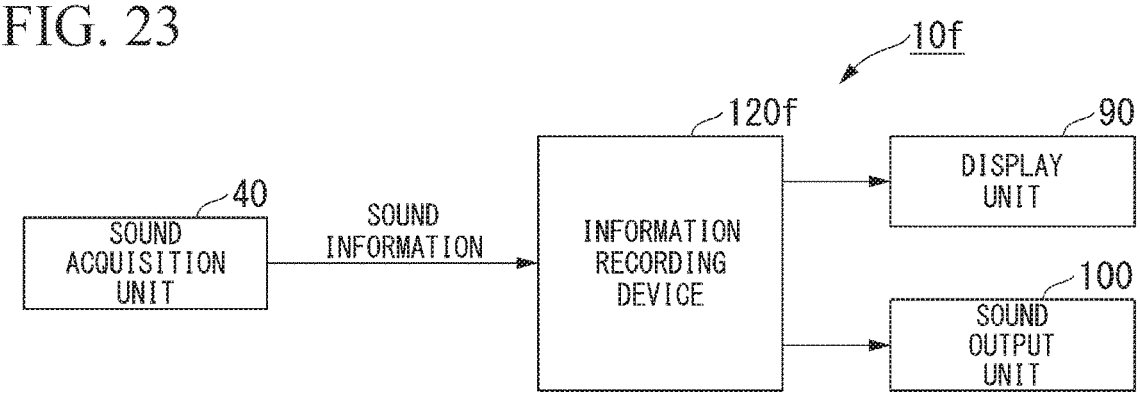
FIG. 23 is a block diagram showing a configuration of an information recording system according to a fourth embodiment of the present invention.

FIG. 23 shows a configuration of an information recording system 10f according to a fourth embodiment of the present invention. In terms of the configuration shown in FIG. 23, differences from the configuration shown in FIG. 15 will be described.

The information recording system 10f shown in FIG. 23 does not include the object information acquisition unit 20 and the image acquisition unit 30 in the information recording system 10d shown in FIG. 15.

In terms of points other than the above, the configuration shown in FIG. 23 is similar to the configuration shown in FIG. 15.

A configuration of an information recording device 120f is similar to that of the 25 information recording device 120 shown in FIG. 17 except for the following points. Sound information from a sound acquisition unit 40 is input to an input unit 130. A recording unit 60 records sound information, text information, conversion candidate word, and time point information on a recording medium 70 such that the sound information, the text information, the conversion candidate word, and the time point information are associated with each other. A reading unit 80 reads text information including a part corresponding to a word matching the keyword from the recording medium 70. Also, the reading unit 80 reads the sound information associated with the time point information corresponding to the word matching the keyword from the recording medium 70. An output unit 140 outputs the sound information and the text information read by the reading unit 80. That is, the output unit 140 outputs the text information to a display unit 90 and outputs the sound information to a sound output unit 100.

The information recording system 10f may not include the sound output unit 100. In this case, the recording unit 60 records the text information and the conversion candidate word on the recording medium 70 such that the text information and the conversion candidate word are associated with each other. The reading unit 80 reads the text information including a part corresponding to a word matching the keyword from the recording medium 70. The output unit 140 outputs the text information read by the reading unit 80. Because the conversion candidate word is associated with a determined word constituting the text information, no time point information may be recorded.

Figure 24:
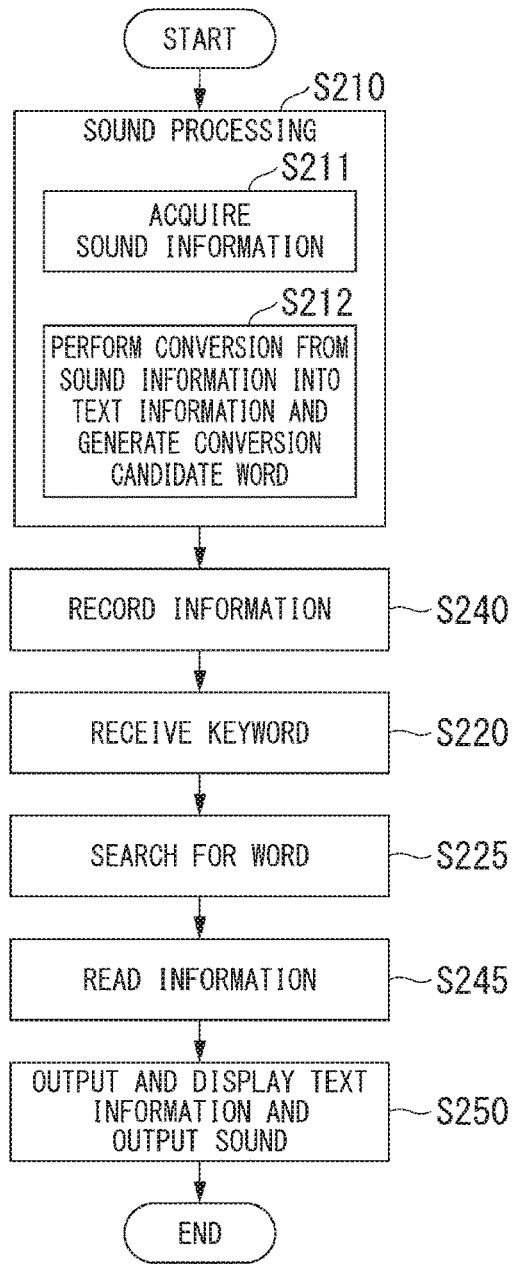
FIG. 24 is a flowchart showing a procedure of processing of an information recording device according to the fourth embodiment of the present invention.

FIG. 24 shows a procedure of processing of the information recording device 120f. In terms of the processing shown in FIG. 24, differences from the processing shown in FIG. 18 will be described.

The processing in steps S200 and S205 shown in FIG. 18 is not performed. After step S210, the recording unit 60 records sound information, text information, conversion candidate word, and time point information stored in a buffer within the recording unit 60 on the recording medium 70 such that the sound information, the text information, the conversion candidate word, and the time point information are associated with each other (step S215 (a recording step)).

After step S225, the reading unit 80 reads the text information including a first part corresponding to a word matching a keyword from the recording medium 70. Also, the reading unit 80 reads the sound information associated with the time point information corresponding to the word matching the keyword from the recording medium 70 (step S245).

After step S245, the output unit 140 outputs the sound information and the text information read by the reading unit 80. The display unit 90 displays the text information output by the output unit 140 such that the first part can be distinguished from a second part other than the first part. Also, the sound output unit 100 outputs a sound based on the sound information read by the reading unit 80 (step S250 (an output step, a display step, and a sound output step)).

When the information recording system 10f does not include the sound output unit 100, the recording unit 60 records the text information and the conversion candidate word on the recording medium 70 such that the text information and the conversion candidate word are associated with each other in step S240. In step S245, the reading unit 80 reads the text information including the first part corresponding to the word matching the keyword from the recording medium 70. In step S250, the output unit 140 outputs the text information read by the reading unit 80. Also, in step S250, the display unit 90 displays the text information read by the reading unit 80 such that the first part and the second part other than the first part can be distinguished.

In terms of points other than the above, the processing shown in FIG. 24 is similar to the processing shown in FIG. 18.

The information recording device 120f can reduce omissions in a word search in text information. As a result, the information recording device 120f can provide the user with text information corresponding to the keyword received by a keyword reception unit 55.

As described above, in the text information, the first part corresponding to the word matching the keyword and the second part other than the first are distinguished and displayed. Thus, the user can easily check a search result.

The matters disclosed in the second modified example of the first embodiment may be similarly applied to the information recording system 10f of the fourth embodiment.

(Supplement)

According to an aspect of the present invention, an information recording device includes an input unit, a sound processing unit, a recording unit, a keyword reception unit, a search unit, and a reading unit. Sound information based on a sound uttered by a user is input to the input unit. The sound processing unit converts the sound information input to the input unit into text information and generates at least one conversion candidate word corresponding to the sound in a process of converting the sound information into the text information. The recording unit records the text information and the conversion candidate word on a recording medium such that the text information and the conversion candidate word are associated with each other. The keyword reception unit receives a keyword. The search unit searches for the keyword received by the keyword reception unit in the text information and the conversion candidate word and extracts a word matching the keyword from words within the text information and the conversion candidate word. The reading unit reads the text information including a part corresponding to the word matching the keyword from the recording medium.

According to an aspect of the present invention, an information recording device includes an input unit, a sound processing unit, a recording unit, a keyword reception unit, a search unit, and a reading unit. Object information about an object and sound information based on a sound uttered by an observer who observes the object are input to the input unit. The sound processing unit converts the sound information input to the input unit into text information and generates at least one conversion candidate word corresponding to the sound in a process of converting the sound information into the text information. The recording unit records the object information, the text information, the conversion candidate word, and time point information on a recording medium such that the object information, the text information, the conversion candidate word, and the time point information are associated with each other. The time point information indicates a time point at which the object information was acquired and a time point at which the sound information based on the text information was acquired. The keyword reception unit receives a keyword. The search unit searches for the keyword received by the keyword reception unit in the text information and the conversion candidate word and extracts a word matching the keyword from words within the text information and the conversion candidate word. The reading unit reads the object information associated with the time point information corresponding to the word matching the keyword from the recording medium.

According to an aspect of the present invention, an information recording method includes an object information acquisition step, a sound acquisition step, a sound processing step, a recording step, a keyword reception step, a search step, a reading step, and a display step. In the object information acquisition step, an object information acquisition unit acquires object information about an object. In the sound acquisition step, a sound acquisition unit acquires sound information based on a sound uttered by an observer who observes the object. In the sound processing step, a sound processing unit converts the sound information acquired by the sound acquisition unit into text information and generates at least one conversion candidate word corresponding to the sound in a process of converting the sound information into the text information. In the recording step, a recording unit records the object information, the text information, the conversion candidate word, and time point information on a recording medium such that the object information, the text information, the conversion candidate word, and the time point information are associated with each other. The time point information indicates a time point at which the object information was acquired and a time point at which the sound information that is a source of the text information was acquired. In the keyword reception step, a keyword reception unit receives a keyword. In the search step, a search unit searches for the keyword received by the keyword reception unit in the text information and the conversion candidate word and extracts a word matching the keyword from words within the text information and the conversion candidate word. In the reading step, a reading unit reads the object information associated with the time point information corresponding to the word matching the keyword from the recording medium. In the display step, a display unit displays the text information read by the reading unit.

According to an aspect of the present invention, an information recording method includes an input step, a sound processing step, a recording step, a keyword reception step, a search step, and a reading step. In the input step, sound information based on a sound uttered by a user is input to an input unit. In the sound processing step, a sound processing unit converts the sound information input to the input unit into text information and generates at least one conversion candidate word corresponding to the sound in a process of converting the sound information into the text information. In the recording step, a recording unit records the text information and the conversion candidate word on a recording medium such that the text information and the conversion candidate word are associated with each other. In the keyword reception step, a keyword reception unit receives a keyword. In the search step, a search unit searches for the keyword received by the keyword reception unit in the text information and the conversion candidate word and extracts a word matching the keyword from words within the text information and the conversion candidate word. In the reading step, a reading unit reads the text information including a part corresponding to the word matching the keyword from the recording medium.

According to an aspect of the present invention, an information recording method includes an input step, a sound processing step, a recording step, a keyword reception step, a search step, and a reading step. In the input step, object information about an object and sound information based on a sound uttered by an observer who observes the object are input to an input unit. In the sound processing step, a sound processing unit converts the sound information input to the input unit into text information and generates at least one conversion candidate word corresponding to the sound in a process of converting the sound information into the text information. In the recording step, a recording unit records the object information, the text information, the conversion candidate word, and time point information on a recording medium such that the object information, the text information, the conversion candidate word, and the time point information are associated with each other. The time point information indicates a time point at which the object information was acquired and a time point at which the sound information that is a source of the text information was acquired. In the keyword reception step, a keyword reception unit receives a keyword. In the search step, a search unit searches for the keyword received by the keyword reception unit in the text information and the conversion candidate word and extracts a word matching the keyword from words within the text information and the conversion candidate word. In the reading step, a reading unit reads the object information associated with the time point information corresponding to the word matching the keyword from the recording medium.

While preferred embodiments of the invention have been described and shown above, it should be understood that these are exemplars of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An information recording system comprising:
an object information acquisition unit configured to acquire object information about an object;
a sound acquisition unit configured to acquire sound information based on a sound uttered by an observer who observes the object;
a sound processing unit configured to convert the sound information acquired by the sound acquisition unit into text information and generate at feast one conversion candidate word corresponding to the sound in a process of converting the sound information into the text information;
a recording unit configured to record the object information, the text information, the conversion candidate word, and time point information on a recording medium such that the object information, the text information, the conversion candidate word, and the time point information are associated with each other, the time point information indicating a time point at which the object information was acquired and a time point at which the sound information that is a source of the text information was acquired;
a keyword reception unit configured to receive a keyword;
a search unit configured to search for the keyword received by the keyword reception unit in the text information and the conversion candidate word and extract a word matching the keyword from words within the text information and the conversion candidate word;
a reading unit configured to read the object information associated with the time point information corresponding to the word matching the keyword from the recording medium; and
a display unit configured to display the object information read by the reading unit,
wherein the recording unit records the object information, the sound information, the text information, the conversion candidate word, and the time point information on the recording medium such that the object information, the sound information, the text information, the conversion candidate word, and the time point information are associated with each other,
the information recording system further comprises an event detection unit configured to detect at least two events on based on at least one piece of the object information and the sound information recorded on the recording medium, the events being a state in which the at least one piece of the object information and the sound information recorded on the recording medium satisfies a predetermined condition,
the reading unit reads at least two pieces of the object information, each of which is associated with the time point information corresponding to an event occurrence time point that is a time point at which the event occurred from the recording medium,
the display unit displays the object information read by the reading unit,
the search unit searches for the keyword received by the keyword reception unit in the text information and the conversion candidate word that are associated with the time point information corresponding to the event occurrence time point, and
the display unit displays the object information associated with the time point information corresponding to the event occurrence time point at which the word matching the keyword was detected such that the object information is distinguished from other object information.

2. The information recording system according to claim 1, wherein, when a state of the object indicated by the object information is predefined as an event detection condition, the event detection unit detects the event.

3. An information recording system comprising:
an object information acquisition unit configured to acquire object information about an object;
a sound acquisition unit configured to acquire sound information based on a sound uttered by an observer who observes the object;
a sound processing unit configured to convert the sound information acquired by the sound acquisition unit into text information and generate at least one conversion candidate word corresponding to the sound in a process of converting the sound information into the text information;
a recording unit configured to record the object information, the text information, the conversion candidate word, and time point information on a recording medium such that the object information, the text information, the conversion candidate word, and the time point information are associated with each other, the time point information indicating a time point at which the object information was acquired and a time point at which the sound information that is a source of the text information was acquired;
a keyword reception unit configured to receive a keyword;
a search unit configured to search for the keyword received by the keyword reception unit in the text information and the conversion candidate word and extract a word matching the keyword from words within the text information and the conversion candidate word;
a reading unit configured to read the object information associated with the time point information corresponding to the word matching the keyword from the recording medium; and
a display unit configured to display the object information read by the reading unit,
wherein the recording unit records the object information, the sound information, the text information, the conversion candidate word, and the time point information on the recording medium such that the object information, the sound information, the text information, the conversion candidate word, and the time point information are associated with each other,
the information recording system further comprises an event detection unit configured to detect at least two events on based on of at least one piece of the object information and the sound information recorded on the recording medium, the events being a state in which the at least one piece of the object information and the sound information recorded on the recording medium satisfies a predetermined condition,
the reading unit reads the object information and the text information that are associated with the time point information corresponding to an event occurrence time point that is a time point at which the event occurred from the recording medium,
the display unit displays the object information and the text information read by the reading unit,
the search unit searches for the keyword received by the keyword reception unit in the text information and the conversion candidate word that are associated with the time point information corresponding to the event occurrence time point, and
the display unit displays the word that is within the text information and matches the keyword such that the word is distinguished from other words within the text information, and displays the word that is within the text information and is associated with the conversion candidate word matching the keyword such that the word is distinguished from other words within the text information.

4. The information recording system according to claim 1, wherein the sound information is a time-series sound signal, and when amplitude or power of the sound signal exceeds a threshold value predefined as an event detection condition, the event detection unit detects the event.

5. The information recording system according to claim 1, wherein, when a sound indicated by the sound information matches a sound of a keyword predefined as an event detection condition, the event detection unit detects the event.

6. The information recording system according to claim 3, wherein, when a state of the object indicated by the object information is predefined as an event detection condition, the event detection unit detects the event.

7. The information recording system according to claim 3, wherein the sound information is a time-series sound signal, and when amplitude or power of the sound signal exceeds a threshold value predefined as an event detection condition, the event detection unit detects the event.

8. The information recording system according to claim 3, wherein, when a sound indicated by the sound information matches a sound of a keyword predefined as an event detection condition, the event detection unit detects the event.

* * * * *